US 12,493,763 B2

(12) United States Patent
Shen et al.

(10) Patent No.: US 12,493,763 B2
(45) Date of Patent: Dec. 9, 2025

(54) CODE SCANNING METHOD AND ELECTRONIC DEVICE

(71) Applicant: Honor Device Co., Ltd., Shenzhen (CN)

(72) Inventors: Tao Shen, Shenzhen (CN); Xiaowei Ma, Shenzhen (CN); Guoying Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/727,938

(22) PCT Filed: Aug. 21, 2023

(86) PCT No.: PCT/CN2023/114075
§ 371 (c)(1),
(2) Date: Jul. 10, 2024

(87) PCT Pub. No.: WO2024/055817
PCT Pub. Date: Mar. 21, 2024

(65) Prior Publication Data
US 2025/0077817 A1     Mar. 6, 2025

(30) Foreign Application Priority Data
Sep. 15, 2022   (CN) .......................... 202211124961.4

(51) Int. Cl.
G06K 7/14        (2006.01)
G06K 7/10        (2006.01)
G06F 9/54        (2006.01)

(52) U.S. Cl.
CPC ......... *G06K 7/146* (2013.01); *G06K 7/10752* (2013.01); *G06K 7/1417* (2013.01)

(58) Field of Classification Search
CPC ....... G06K 7/146; G06K 7/1417; G06F 9/545
(Continued)

(56) References Cited

U.S. PATENT DOCUMENTS 10,658,007 B2 * 5/2020 Davis .................... G06F 3/0482
10,902,234 B2   1/2021 Feng et al.
(Continued)

FOREIGN PATENT DOCUMENTS

CN      105243350 A     1/2016
CN      107205137 A     9/2017
(Continued)

*Primary Examiner* — Toan C Ly
(74) *Attorney, Agent, or Firm* — Rimon PC

(57) ABSTRACT

Embodiments of this application provide a code scanning method and an electronic device. The method is applicable to the electronic device. The electronic device includes a camera. The method includes: The electronic device displays a code scanning interface, and then obtains an identification frame image and a preview frame image, where the identification frame image and the preview frame image are obtained by processing a code scanning image collected by the camera. The electronic device displays the preview frame image in the code scanning interface. The electronic device conducts, in a case that ambient light brightness of the identification frame image is greater than or equal to a threshold, code scanning identification on the identification frame image, and determines a code scanning identification result. According to the method, an invalid identification frame image is deleted, to improve code scanning efficiency.

12 Claims, 22 Drawing Sheets

(58) Field of Classification Search
USPC .......................................................... 235/455
See application file for complete search history.

(56) References Cited

U.S. PATENT DOCUMENTS

| | | | |
|---|---|---|---|
| 11,159,739 B2 | 10/2021 | Kim et al. | |
| 2003/0019933 A1* | 1/2003 | Tsikos .................... | G06K 7/10 |
| | | | 235/454 |
| 2011/0155808 A1 | 6/2011 | Santos et al. | |
| 2015/0146925 A1* | 5/2015 | Son ...................... | G06V 10/235 |
| | | | 382/103 |
| 2018/0293350 A1* | 10/2018 | Dimov ................... | G16H 50/20 |
| 2021/0127058 A1 | 4/2021 | Sharma et al. | |
| 2023/0043815 A1 | 2/2023 | Chen et al. | |

FOREIGN PATENT DOCUMENTS

| | | |
|---|---|---|
| CN | 108307139 A | 7/2018 |
| CN | 108399349 A | 8/2018 |
| CN | 108763999 A | 11/2018 |
| CN | 110363036 A | 10/2019 |
| CN | 110830730 A | 2/2020 |
| CN | 112749575 A | 5/2021 |
| CN | 113408314 A | 9/2021 |
| CN | 113452921 A | 9/2021 |
| CN | 113453054 A | 9/2021 |
| CN | 113496133 A | 10/2021 |
| CN | 113919382 A | 1/2022 |
| CN | 113935352 A | 1/2022 |
| JP | 2019091209 A | 6/2019 |
| WO | 2020038069 A1 | 2/2020 |
| WO | 2021167230 A1 | 8/2021 |

\* cited by examiner

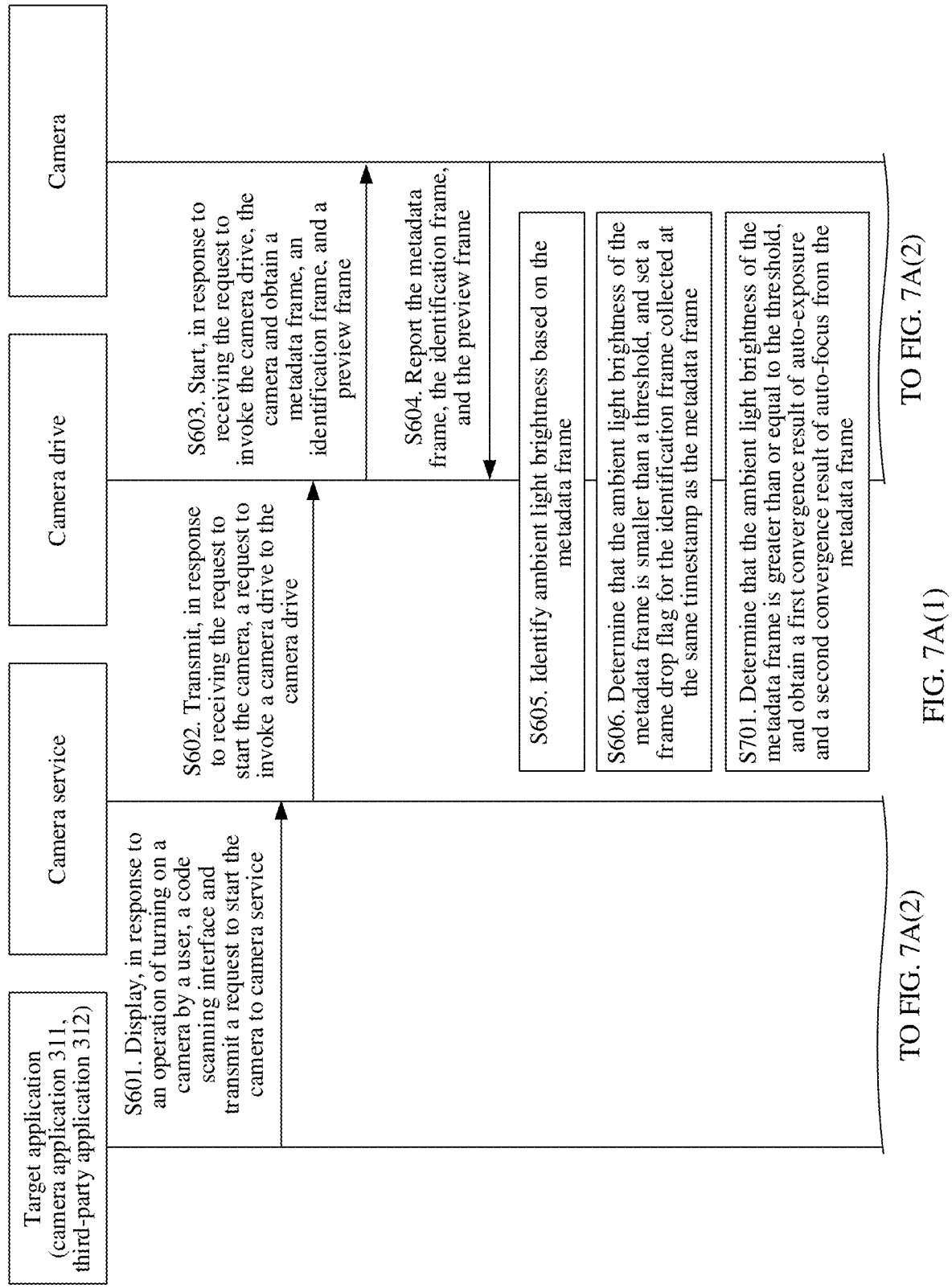
FIG. 7A(1)

S702. Determine that the auto-exposure and/or the auto-focus are/is in a convergence state based on the first convergence result and the second convergence result, and set the frame drop flag for the identification frame collected at the same timestamp as the metadata frame according to a frame drop strategy S703. Determine that the auto-exposure and the auto-focus are both in a convergence end state based on the first convergence result and the second convergence result, and end an operation of setting the frame drop flag for the identification frame according to the frame drop strategy S607. Report the identification frame and the preview frame S608. Detect whether the identification frame is marked, and return the preview frame and the identification frame including no mark to a target application S609. Display the preview frame in a code scanning interface, identify the identification frame, and determine an identification result

FIG. 7A(2)

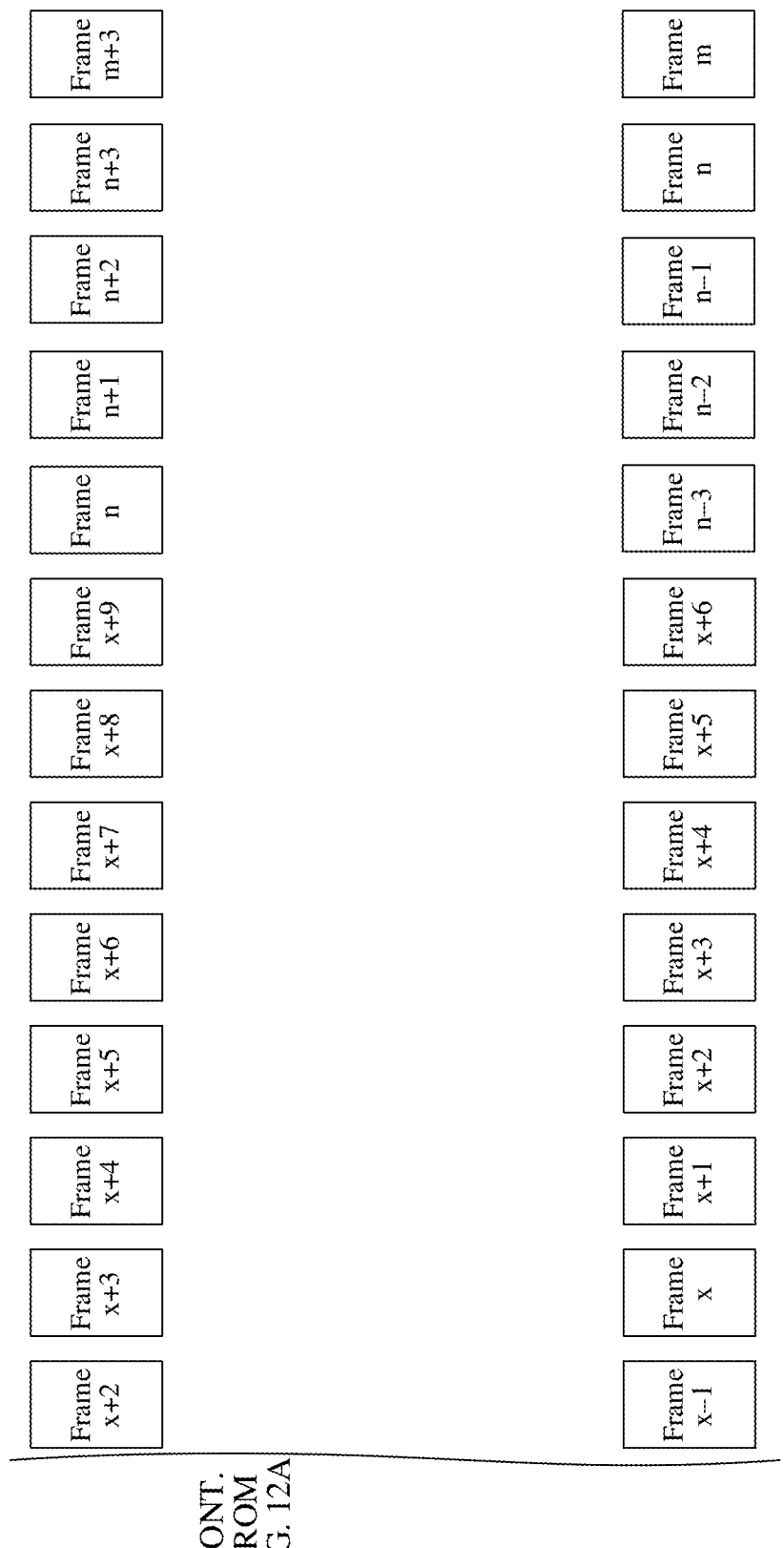

CODE SCANNING METHOD AND ELECTRONIC DEVICE

CROSS-REFERENCE TO RELATED APPLICATIONS

This application is a national stage of International Application No. PCT/CN2023/114075, filed on Aug. 21, 2023, which claims priority to Chinese Patent Application No. 202211124961.4, filed on Sep. 15, 2022, both of which are incorporated herein by reference in their entireties.

TECHNICAL FIELD

This application relates to the technical field of terminals, and in particular, relates to a code scanning method and an electronic device.

BACKGROUND

There are increasing scenes of code scanning along with popularization of smart terminals and development and widespread application of an image identification technology. For example, one needs to scan a payment/collection code when making a payment transaction through a payment application, scan a personal two-dimensional code when adding a friend through a social application, and scan a passage code when entering and exiting a particular place.

A code scanning speed influences users' code scanning experience. In an existing method for identifying a code scanning image collected by a camera in a code scanning process, a code scanning speed is low, which causes difficulty with code scanning and influences user experience.

An effective solution for a low code scanning speed has not yet been provided.

SUMMARY

Embodiments of this application provide a code scanning method and an electronic device, which can reduce a number of invalid identification frame images identified by the electronic device, such that a number of threads created for identification frame images can be reduced, a space of a memory occupied by an identification process can be decreased, and identification time can be shortened. In this way, identification efficiency is improved.

To achieve the above objectives, embodiments of this application use the following technical solution:

In a first aspect, this application provides a code scanning method. The method is applicable to the electronic device. The electronic device includes a camera. The method includes: The electronic device displays a code scanning interface, and then obtains an identification frame image and a preview frame image, where the identification frame image and the preview frame image are obtained by processing a code scanning image collected by the camera. The electronic device displays the preview frame image in the code scanning interface. The electronic device conducts, in a case that ambient light brightness of the identification frame image is greater than or equal to a threshold, code scanning identification on the identification frame image, and determines a code scanning identification result.

In this application, the electronic device does not identify an identification frame image collected when the ambient light brightness is smaller than a preset value, and only identifies an identification frame image collected when the ambient light brightness is greater than the preset value. Therefore, a number of identification frame images required to be identified is smaller. Compared with a solution without dropping the identification frame image, this application drops an invalid identification frame image, that is, drops an identification frame image in which an identification code cannot be identified. Therefore, this application cannot prolong code scanning duration, and can further resolve problems of wasting computing resources of devices and reducing a code scanning speed due to identifying an invalid frame by a target application, such that code scanning efficiency is improved.

In addition, the electronic device selectively identifies only the identification frame image, and a number of preview frame images displayed in the code scanning interface is consistent with that of code scanning images collected by the camera, such that normal preview of an image collected by the camera in the code scanning interface is not influenced. That is, dropping the identification frame image is not visually perceptible to a user, and the preview frame image displayed in the code scanning interface does not influence viewing experience of the user due to frame drop. Therefore, this application can reduce a number of identification frame images to be identified by the target application without influencing normal preview of the image collected by the camera in the code scanning interface, such that a number of threads created for identification frame images can be reduced, a space of a memory occupied by an identification process can be decreased, and identification time can be shortened. In this way, identification efficiency is improved.

In a possible design mode of the first aspect, the conducting, in a case that ambient light brightness of the identification frame image is greater than or equal to a threshold, code scanning identification on the identification frame image includes: conducting, in a case that the ambient light brightness of the identification frame image is greater than or equal to the threshold and an exposure convergence operation and a focus convergence operation of the camera are completed, code scanning identification on the identification frame image.

In addition, the method further includes: deleting, in a case that the ambient light brightness of the identification frame image is greater than or equal to the threshold and the exposure convergence operation or the focus convergence operation of the camera is detected, the identification frame image obtained by the camera based on the code scanning image in a process of performing the exposure convergence operation or the focus convergence operation, where the identification frame image deleted is not for code scanning identification.

In the design mode, the electronic device deletes the identification frame image obtained from the code scanning image in an exposure convergence process or a focus convergence process of the camera, such that code scanning identification may not be conducted on the identification frame image obtained in the exposure process or convergence process of the camera, and further a processing number of invalid identification frame images having low brightness and low sharpness can be reduced. Specifically, when the camera is in an auto-exposure convergence state, the code scanning image collected may have a problem of under-exposure or over-exposure, resulting in low brightness of the identification frame image obtained from the code scanning image, which makes code scanning identification difficult. In a case that the electronic device conducts code scanning identification on the identification frame image having low brightness, computing resources of a device are wasted, and a code scanning speed is reduced.

Therefore, the design mode drops the identification frame image having low brightness, to improve identification efficiency. Similarly, when the camera is in an auto-focus convergence state, the camera automatically adjusts a focal length, and the focal length does not reach a target value in an adjustment process, and sharpness of the code scanning image collected in a focal length adjustment process is low, so sharpness of the identification frame image obtained from the code scanning image is also low, which makes code scanning identification difficult. Based on the above description, the electronic device drops the identification frame image having low sharpness, to improve identification efficiency.

In a possible design mode of the first aspect, the conducting, in a case that ambient light brightness of the identification frame image is greater than or equal to a threshold, code scanning identification on the identification frame image includes: conducting, in a case that the ambient light brightness of the identification frame image is greater than or equal to the threshold, the identification frame image includes an identification code, and a size of the identification code increases, code scanning identification on the identification frame image corresponding to the identification code having a size increased.

In the design mode, the electronic device conducts code scanning identification on the identification frame image only when the identification frame image includes the identification code and the size of the identification code increases. In this way, an identification number of identification frame images can be reduced, to improve identification efficiency.

In a possible design mode of the first aspect, the conducting, in a case that ambient light brightness of the identification frame image is greater than or equal to a threshold, code scanning identification on the identification frame image includes: conducting, in a case that the ambient light brightness of the identification frame image is greater than or equal to the threshold and an image magnification operation performed in the code scanning interface is detected, code scanning identification on the identification frame image obtained based on the code scanning image after the image magnification operation is performed.

In the design mode, the electronic device detects the image magnification operation. The image magnification operation indicates adjusting a display size of the identification code by a user. In this way, a size of the identification code adjusted is greater, such that image quality of the identification frame image is high. Therefore, a probability of successful identification after identifying the identification frame image is greater, and identification efficiency is higher.

In a possible design mode of the first aspect, before the conducting code scanning identification on the identification frame image obtained based on the code scanning image after the image magnification operation is performed, the method further includes: determining that the identification frame image includes the identification code.

In a possible design mode of the first aspect, before the displaying a code scanning interface, the method further includes: starting a target application; and the conducting, in a case that ambient light brightness of the identification frame image is greater than or equal to a threshold, code scanning identification on the identification frame image includes: conducting, in a case that the ambient light brightness of the identification frame image is greater than or equal to the threshold and an application identifier of the target application is a preset identifier, code scanning identification on the identification frame image.

The preset identifier may be preset for distinguishing a target application requiring no at-intervals frame drop. In a case that the application identifier is the preset identifier, the target application identifies only a last identification frame image after identification of each thread ends, which reduces a number of identification frame images required to be identified by the application. The electronic device does not delete the identification frame image for the target application carrying the preset identifier, such that a problem that a code scanning speed becomes low due to deletion of too many identification frame images can be resolved.

In a possible design mode of the first aspect, the conducting, in a case that ambient light brightness of the identification frame image is greater than or equal to a threshold, code scanning identification on the identification frame image includes: conducting, in a case that the ambient light brightness of the identification frame image is greater than or equal to the threshold, the identification frame image includes no identification code, and a dragging operation on the preview frame image in the code scanning interface is detected, code scanning identification on the identification frame image obtained by processing the same code scanning image as the preview frame image.

In the design mode, in response to detecting an operation of dragging an image, the identification frame image is not deleted, that is, code scanning identification is conducted on the identification frame image after the dragging operation is performed. Specifically, in a code scanning process, when the code scanning interface includes no identification code, on one hand, the user may adjust a photographing angle of the camera or magnify the image in the code scanning interface, to implement the identification code in the code scanning interface. In addition, the user may adjust a position of the identification code in the code scanning interface by dragging the image according to the design mode. When the target application detects the operation of dragging the image, it is highly possible that the identification code is included in the code scanning interface after the operation, so consecutive identification frame images collected by the camera after the operation are identified. In this way, the situation that code scanning time is excessively long due to missed detection of the identification frame image is avoided, and further code scanning efficiency is improved.

In a possible design mode of the first aspect, the method further includes: obtaining a metadata frame, where the metadata frame includes a collection parameter of the code scanning image used to be processed to obtain the identification frame image; and obtaining an illumination intensity parameter from the collection parameter, and determining the ambient light brightness of the identification frame image based on the illumination intensity parameter.

In the design mode, the ambient light brightness is indicated by the illumination intensity parameter. The illumination intensity parameter includes: Luxindex. For example, the ambient light brightness is a reciprocal of Luxindex, that is, 1/Luxindex. A greater value of Luxindex indicates smaller ambient light brightness and a darker code scanning scene. A smaller value of Luxindex indicates greater ambient light brightness and a brighter code scanning scene. Based on the above description, the electronic device obtains the illumination intensity parameter from the metadata frame, such that the ambient light brightness of the identification frame image and the preview frame image obtained by processing the code scanning image corresponding to the metadata frame may be determined, and whether an illumination environment is excellent or poor may be determined based on the ambient light brightness. In a case that the illumination environment is poor, no code scanning identification is conducted. In a case that the illumination environment is excellent, code scanning identification is conducted. In this way, identification of an invalid identification frame image obtained in the case that the illumination environment is poor is reduced, to improve code scanning efficiency.

In a possible design mode of the first aspect, the method further includes: in a case that the ambient light brightness of the identification frame image is smaller than the threshold, or in a case that the exposure convergence operation or the focus convergence operation of the camera is detected in the case that the ambient light brightness of the identification frame image is greater than or equal to the threshold, or in a case that the size of the identification code in the identification frame image is smaller than or equal to a preset size in the case that the ambient light brightness of the identification frame image is greater than or equal to the threshold, or in a case that the identification frame image includes no identification code in the case that the ambient light brightness of the identification frame image is greater than or equal to the threshold, setting a frame drop flag for the identification frame image. The conducting, in a case that ambient light brightness of the identification frame image is greater than or equal to a threshold, code scanning identification on the identification frame image includes: conducting code scanning identification on the identification frame image including no frame drop flag, where the ambient light brightness of the identification frame image including no frame drop flag is greater than or equal to the threshold.

In the design mode, the electronic device sets a frame drop flag for an identification frame image that needs to be deleted, to indicate that the identification frame image is not for code scanning identification. In this way, the electronic device may conduct code scanning identification on the identification frame image including no frame drop flag, to reduce an identification number of identification frame images.

In a possible design mode of the first aspect, the setting a frame drop flag for the identification frame image includes: setting the frame drop flag for at least one identification frame image in each preset frame drop periodicity.

In the design mode, the electronic device sets the frame drop flag for the identification frame image through an at-intervals frame drop strategy. That is, with T as a frame drop periodicity, N identification frame images are dropped in each frame drop periodicity. In this way, according to the frame drop strategy, the electronic device may set frame drop flags for the N identification frame images in the frame drop periodicity T.

In some embodiments, the electronic device may set frame drop flags for all identification frame images that satisfy the above frame drop condition.

In some other embodiments, the electronic device may set frame drop flags for the first M identification frame images that satisfy the above frame drop condition.

Through different frame drop strategies, the electronic device may selectively delete the invalid identification frame image, to achieve fast code scanning.

In a second aspect, this application provides an electronic device. The electronic device includes: a memory and one or more processors. The memory is coupled to the processor. The memory is configured to store a computer program code. The computer program code includes computer instructions. When the computer instructions are executed by the processor, the electronic device is enabled to perform the methods according to the first aspect and any one of the possible design modes thereof.

In a third aspect, this application provides a computer-readable storage medium. The computer-readable storage medium may include computer instructions. When the computer instructions are run on an electronic device, the electronic device is enabled to perform the method according to the first aspect and the possible design modes thereof.

In a fourth aspect, this application provides a computer program product. When the computer program product runs on a computer, the computer is enabled to perform the method according to the first aspect and any one of the possible design modes thereof.

It may be understood that the electronic device according to the second aspect, the computer storage medium according to the third aspect and the computer program product according to the fourth aspect are all provided to perform the corresponding method provided above. Therefore, refer to beneficial effects of the corresponding method provided above for beneficial effects that may be achieved by the electronic device, the computer storage medium and the computer program product, which will not be repeated herein.

BRIEF DESCRIPTION OF DRAWINGS

FIG. 7A(1) and FIG. 7A(2) show an interaction diagram of another code scanning method according to an embodiment of this application;

FIG. 12A and FIG. 12B show a schematic effect diagram corresponding to still another code scanning method according to an embodiment of this application.

DESCRIPTION OF EMBODIMENTS

The following terms "first" and "second" are used merely for the purpose of description, and should not be construed as indicating or implying relative importance or implicitly specifying a number of indicated technical features. Therefore, features limited by "first" or "second" may explicitly or implicitly include one or more of the features. In the description of embodiments, unless otherwise specified, "a plurality of" means two or more.

Currently, although a code scanning scene is increasingly widely used, an identification speed of an identification code is influenced due to differences in factors such as device load, memory, illumination environments, and image quality.

For example, when the same identification code is scanned with the same application, the identification speed is low in a case of high device load pressure, small available memory capacity, a dark environment, a small picture of an identification code; and the identification speed is high in a case of low device load pressure, great available memory capacity, a light environment, a large picture of an identification code. In the above scene where the identification speed is high, time consumed by a code scanning process that may be perceived by a user is short, such that the user has excellent code scanning experience. Once a device is in the low identification speed, time consumed by a code scanning process that may be perceived by a user may be prolonged, such that the user has poor code scanning experience. However, an existing code scanning technique cannot identify the identification code faster in a case that the device is in the low identification speed, to make the user difficult in code scanning.

In addition, a code scanning speed is further influenced by differences in code scanning identification principles of applications. Identification processes of code scanning through two types of applications of different identification algorithms will be illustrated below.

Figure 1:
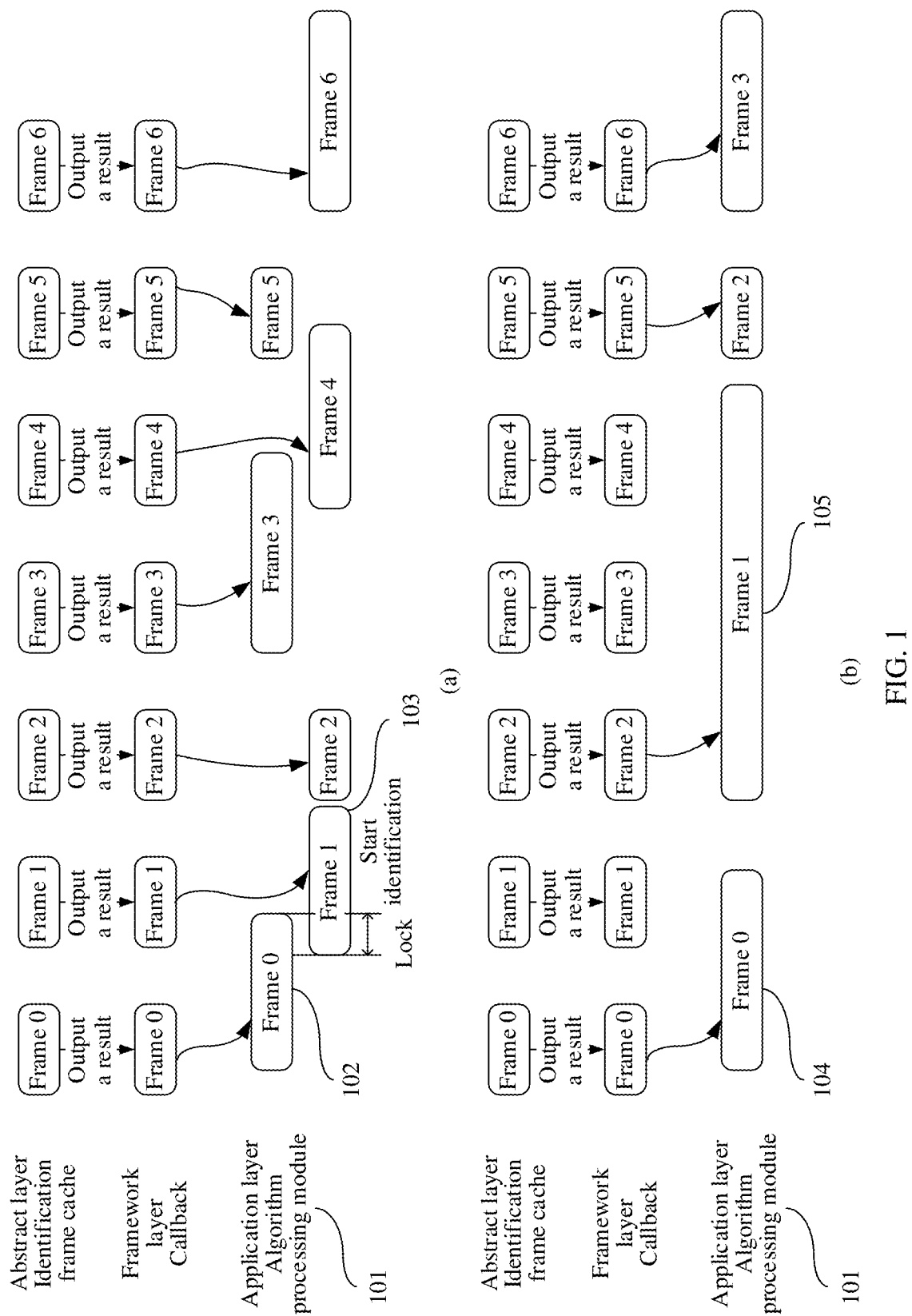
FIG. 1 shows schematic diagrams of code scanning identification principles of two types of applications according to an embodiment of this application.

FIG. 1 shows schematic diagrams of code scanning identification principles of two types of applications according to an embodiment of this application. As shown in FIG. 1, a first type of application identifies each identification frame (also referred to as identification frame image), such that an identification speed is low. Specifically, as shown in (a) of FIG. 1, after a device runs the first type of application, a camera returns 30 frames per second (fps) to an abstract layer, that is, the camera returns one frame of data including every 33 millisecond (ms) after being started. The data includes one preview frame (also referred to as a preview frame image, and not shown in FIG. 1) and one identification frame. The preview frame is used to be displayed in the code scanning interface. The identification frame is used to obtain information of the identification code. The identification frame is stored in a cache way in the abstract layer, such that the identification frame may be processed before being rendered to a screen. The first type of application creates one thread for each identification frame that is returned to an algorithm processing module 101 of the first type of application, to identify information of the identification frame, such that a mutex is used between every two threads to ensure serial execution between the threads. As shown in (a) of FIG. 1, when a first thread 102 identifies a 0th identification frame, a 1st identification frame returns to the algorithm processing module 101 of the first type of application, but identification of the 1st identification frame by the second thread 103 does not start until identification of the 0th identification frame by the first thread 102 ends. That is, the first thread 102 occupies the mutex when the first thread 102 identifies the 0th identification frame. In this case, the second thread 103 is locked (which is also referred to lock), and an identification operation cannot be performed. The second thread 103 does not occupy the mutex until the first thread 102 completely identifies the 0th identification frame, and the second thread starts to identify the 1st identification frame (which is also referred to as process).

The second type of application identifies a last identification frame after identification of each thread ends, such that an identification speed is high. As shown in (b) of FIG. 1, after the device runs a second type of application, the camera returns one frame of data every 33 ms in a similar way. The data includes one preview frame and one identification frame. However, in a case that an algorithm processing module 101 of the second type of application identifies not identification code each time after identifying one identification frame, one thread is created to capture the last identification frame that returns to the algorithm processing module 101, and the last identification frame is identified. As shown in (b) of FIG. 1, when a third thread 104 identifies a 0th identification frame, a 1st identification frame returns to the algorithm processing module 101 of the second type of application, but the algorithm processing module 101 does not create a fourth thread 105 until identification of the 0th identification frame by the third thread 104 ends. Then, the algorithm processing module 101 captures the last identification frame for the fourth thread 105. That is, a 2nd identification frame shown in (b) of FIG. 1 is returned to the algorithm processing module 101, and the fourth thread 105 starts to identify the 2nd identification frame. That is, although the algorithm processing module 101 receives two identification frames when creating the fourth thread 105, the second type of application does not identify each identification frame, and captures the last identification frame to identify whether an identification code exists in the identification frame.

In the above description of identification processes of the first type of application and the second type of application, the first type of application identifies each identification frame, such that code scanning with the first type of application may cause at least two problems. One of the problems is that a number of threads created is great, and a memory space occupied is large. In a scene where device load pressure is high and available memory capacity is small, computing resources allocated to the threads are insufficient, such that an identification speed is influenced, and further a code scanning speed of a user is influenced. The other of the problems is that the first type of application may identify an image frame collected in a case of poor illumination environment and image quality, such that an identification code cannot be identified, and further thread resources and memory space are wasted.

The second type of application identifies only part of the identification frames, and also first processes a first identification frame collected by the camera. In the case of the poor illumination environment and image quality, the second type of application may also conduct a great amount of invalid identification, such that the computing resources of the device are wasted.

To avoid a case in which the device identifies invalid identification frames, an embodiment of this application provides a code scanning method, which may be applied to an electronic device. The electronic device identifies only part of identification frames collected by a camera in the above scene of the poor illumination environment and image quality when conducting code scanning, such that a number of threads created for the identification frames can be reduced, a space of a memory occupied by an identification process can be decreased, and identification time can be shortened. In this way, identification efficiency is improved.

For example, the electronic device according to this embodiment of this application may be a device capable of supporting a camera function, such as a mobile phone, a tablet computer, a desktop computer, a laptop computer, a handheld computer, a notebook computer, an ultra-mobile personal computer (UMPC), a netbook, or an augmented reality (AR) or virtual reality (VR) device. A specific form of the electronic device is not particularly limited by this embodiment of this application.

Before the code scanning method according to this embodiment of this application is described in detail, a structure of the electronic device will be introduced herein.

Figure 2:
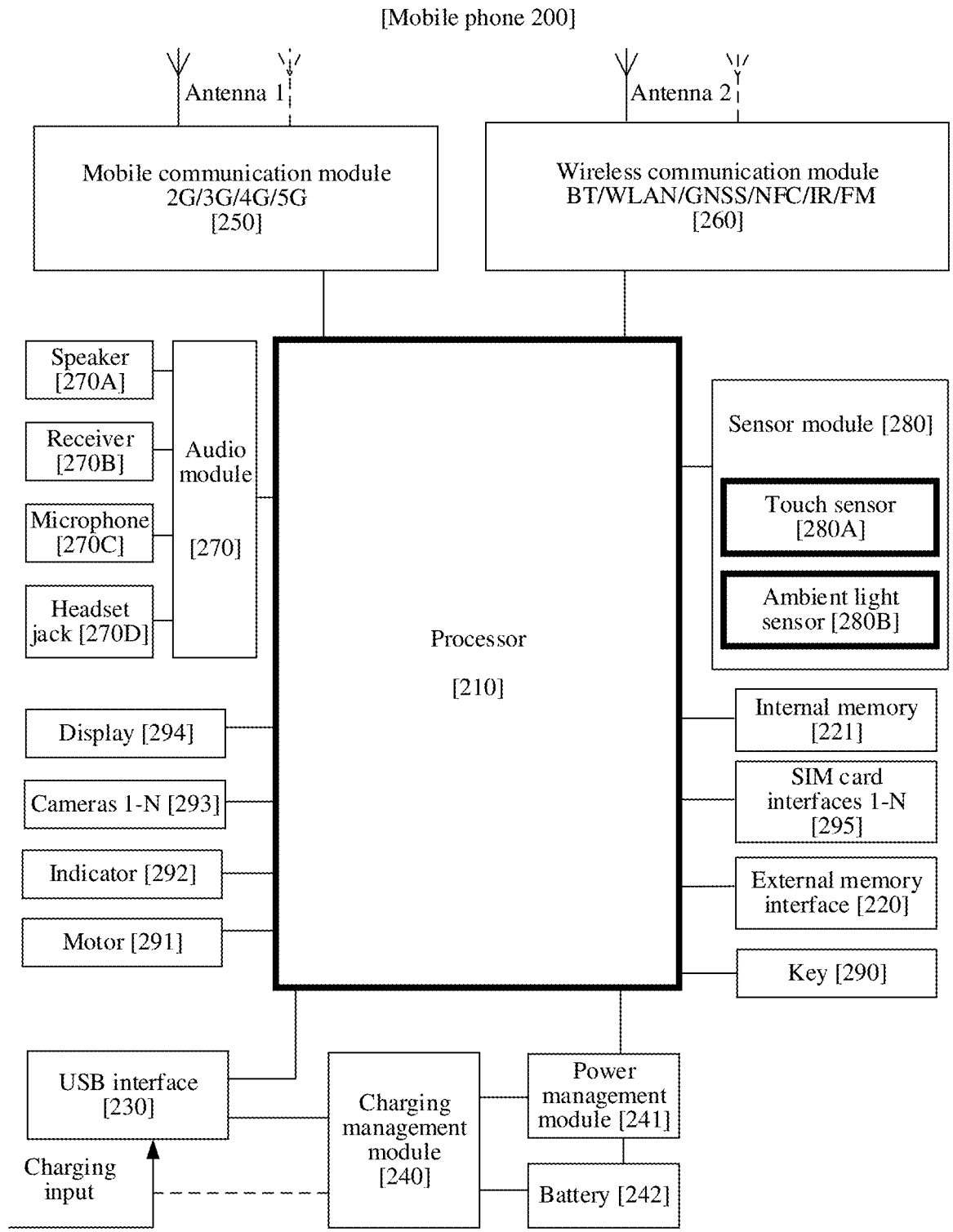
FIG. 2 shows a schematic diagram of a hardware structure of an electronic device according to an embodiment of this application.

FIG. 2 shows a schematic diagram of a hardware structure of an electronic device according to an embodiment of this application. As shown in FIG. 2, with the electronic device as a mobile phone 200 as an example, the mobile phone 200 may include a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headphone jack 270D, a sensor module 280, a touch sensor 280A, an ambient light sensor 280B, a key 290, a motor 291, an indicator 292, a camera 293, a display screen 294, a subscriber identification module (SIM) card interface 295, etc.

It may be understood that the structure illustrated in this embodiment does not constitute a specific limitation on the mobile phone 200. In some other embodiments, the mobile phone 200 may include more or fewer components than those shown in the figure, or some components may be combined, or some components may be split, or components are arranged in different manners. The components shown in the figures may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), etc. Different processing units may be separate devices, or may be integrated into one or more processors.

The controller may be a nerve center and a command center of the mobile phone 200. The controller may generate an operation control signal based on instruction operation code and a time sequence signal, and control obtaining and executing of instructions.

The processor 210 may be further provided with a memory that is configured to store instructions and data. In some embodiments, the memory in the processor 210 is a cache memory. The memory may store instructions or data that is just used or cyclically used by the processor 210. In a case that the processor 210 needs to reuse the instructions or data, the processor may directly invoke the instructions or data from the memory. In this way, repeated access is avoided, waiting time of the processor 210 is shortened, and further system efficiency is improved. In some embodiments of this application, the memory may store an executable program for identifying an illumination environment and an image magnification operation, and user data, application data, etc., generated by performing the above operations.

A wireless communication function of the mobile phone 200 may be implemented with the antenna 1, the antenna 2, the mobile communication module 250, the wireless communication module 260, the modem processor, the baseband processor, etc. In some embodiments of this application, the mobile phone 200 may transmit a signal of starting a target application, a signal of invoking a camera drive, etc., through the above wireless communication module 260. After identifying an identification code, the mobile phone 200 may perform a corresponding operation based on the identification code identified through the mobile communication module 250 or the wireless communication module 260. The operation may be to open a web page or transmit unlocking instructions to a shared vehicle for example.

The touch sensor 280A is also referred to as a "touch device". The touch sensor 280A may be arranged on the display screen 294. The touch sensor 280A and the display screen 294 constitute a touchscreen, which is also referred to as a "touch control screen". The touch sensor 280A is configured to detect a touch operation performed on or near the touch sensor. The touch sensor 280A may transmit a touch operation detected to an application processor, to determine a touch event type. Visual output related to the touch operation may be provided through the display screen 294. In some embodiments, the touch sensor 280A may be arranged on a surface of the mobile phone 200, and is located at a position different from that of the display screen 294. In this embodiment of this application, the mobile phone 200 may detect a touch operation by a user on an icon of the target application by using the touch sensor 280A. In response to the touch operation, the mobile phone 200 starts the target application. In some embodiments of this application, the mobile phone 200 may detect that the user performs an image magnification operation in a code scanning preview interface by using the touch sensor 280A. In response to the image magnification operation, the mobile phone 200 ends an operation of identifying part of the identification frames, and then starts to identify all the identification frames collected by the camera 293 after performing the image magnification operation frame by frame.

The ambient light sensor 280B is configured to sense ambient light brightness (also referred to as an illumination environment). In some embodiments of this application, the mobile phone 200 determines whether to identify an identification code of an identification frame collected currently based on the ambient light brightness. Specifically, in a case that the ambient light brightness is smaller than a threshold, the illumination environment is dark, such that the mobile phone 200 does not process the identification frame collected at the ambient light brightness; and in a case that the ambient light brightness is greater than or equal to a threshold, the illumination environment is light, such that the mobile phone 200 processes the identification frame collected at the ambient light brightness. In this way, the mobile phone 200 may effectively resolve a problem of wasting computing resources of a device in a case that invalid recognition frames are processed in a poor illumination environment, such that identification efficiency is improved.

The mobile phone 200 achieves a display function by using the GPU, the display screen 294, the application processor, etc. The GPU is a microprocessor for image processing and connects the display screen 294 and the application processor. The GPU is configured to conduct mathematical and geometric computation, and is configured to render graphics. The processor 210 may include one or more GPUs, and execute program instructions to generate or change display information.

The display screen 294 is configured to display an image, a video, etc. The display screen 294 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, quantum dot light emitting diodes (QLED), etc.

The mobile phone 200 may achieve a photographing function by using the ISP, the camera 293, the video codec, the GPU, the display screen 294, the APP processor, etc.

The ISP is configured to process data fed back by the camera 293. For example, during photographing, a shutter is turned on. Light is transmitted to a photosensitive element of the camera through a lens, and an optical signal is converted into an electrical signal. The photosensitive element of the camera transmits the electrical signal to the ISP for processing, and further the electrical signal is converted into an image visible to a naked eye. The image may be an image including an identification code or an image including no identification code. The ISP may further optimize noise point, brightness, and skin tone algorithms. The ISP may further optimize parameters such as exposure and color temperature of a photographing scene. In some embodiments, the ISP may be arranged in the camera 293.

The camera 293 is configured to capture a static image or video. An optical image of an object is generated through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in standard RGB and YUV formats. In some embodiments, the mobile phone 200 may include one or N cameras 293. N is a positive integer greater than 1.

In this embodiment of this application, the mobile phone 200 may obtain a preview frame, an identification frame, a metadata frame by using the camera 293. Specifically, the camera collects a code scanning image. The code scanning image is also referred to as raw data. The ISP converts the raw data into YUV data (also referred to as a brightness-chrominance-saturation map), outputs one channel of YUV data as one channel of preview stream and one channel of preview frame based on needs of the target application, and outputs a metadata frame of each frame of YUV data at the same time, which is configured to describe an illumination intensity, an auto-focus parameter, an auto-exposure parameter, an auto-white balance parameter, etc., of the YUV data.

Figure 3:
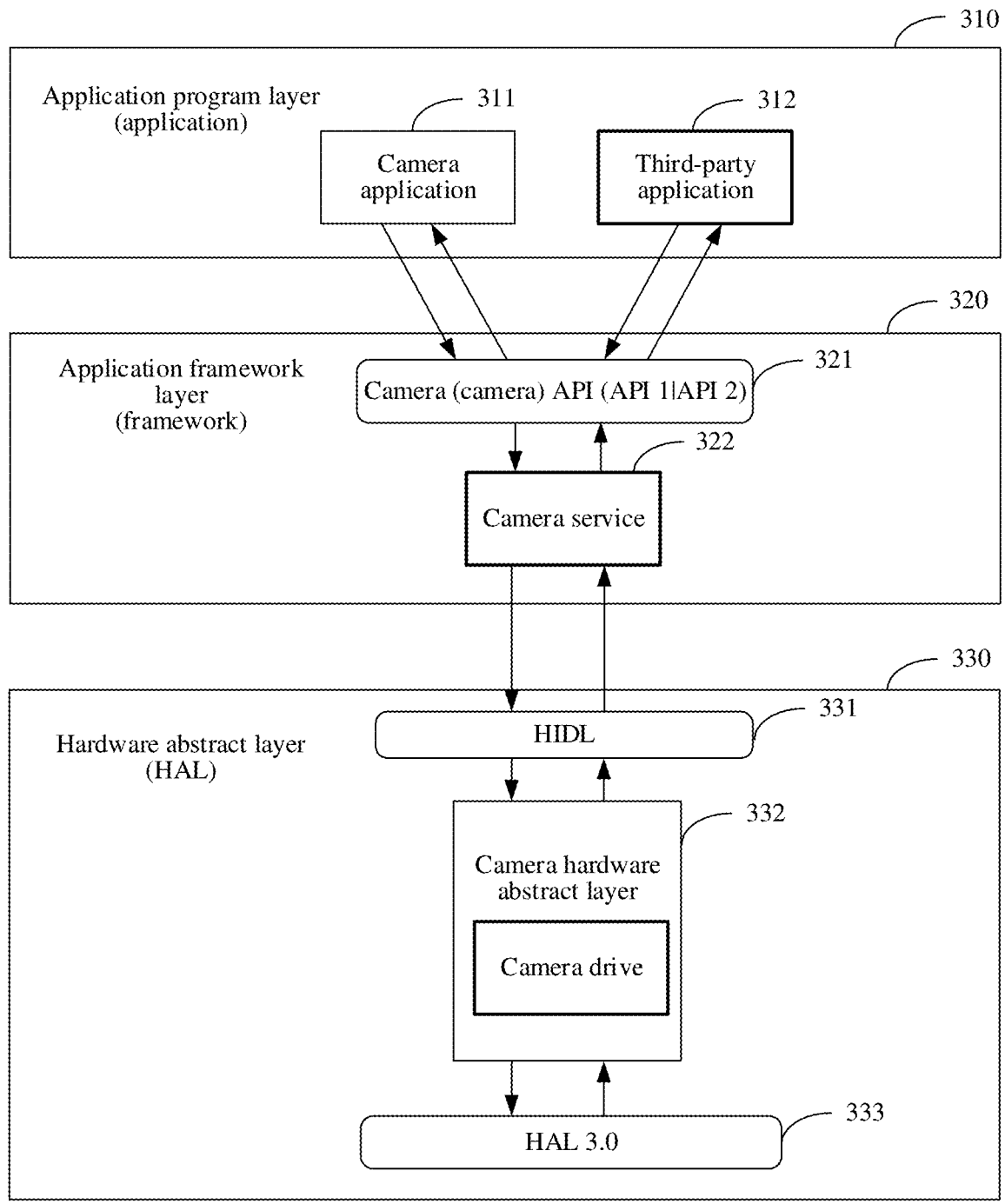
FIG. 3 shows a block diagram of a software structure of an electronic device according to an embodiment of this application.

FIG. 3 shows a block diagram of a software structure of an electronic device according to an embodiment of this application. A software system of the electronic device may be of a layered architecture, an event-driven architecture, a microkernel architecture, a micro service architecture, or a cloud architecture. This embodiment of this application illustrates a software structure of the mobile phone 200 with an Android system of a layered architecture as an example.

As shown in FIG. 3, the layered architecture may divide software into several layers, and each layer has a clear role and task. The layers are in communication with each other through a software interface. In some embodiments, the Android system is divided into four layers, which include an application program layer 310 (also referred to as an application layer for short), an application framework layer 320 (also referred to as a framework layer for short), a hardware abstract layer 330 (HAL), and a kernel layer (Kernel, also referred to as a drive layer) from top to bottom. It should be noted that in this embodiment of this application, the kernel layer is used to provide simple access to a hardware logic, and functional actions embodying a hardware access logic (for example, a frame skip identification logic described in detail in the following method embodiments) are placed in the HAL layer. The HAL layer may be in direct communication with a camera of the hardware layer not via the kernel layer, such that the kernel layer is not shown in FIG. 3.

The application layer (Application) 310 may include a series of application packages. The plurality of application packages may include applications such as camera, photo library, calendar, call, map, navigation, WLAN, Bluetooth, music, video, short message, and launcher (Launcher).

In this embodiment of this application, the application layer 310 may include a camera system application (also referred to as a camera application) 311. Running the camera application 311, such as taking pictures and recording, requires use of a camera.

In this embodiment of this application, the application layer 310 may also include other applications (also referred to as third-party applications) 312 that require the use of the camera. For example, if code scanning functions of WeChat™, Alipay™, TikTok™, etc., all require the use of the camera, the other third-party applications 312 may be WeChat™, Alipay™, TikTok™, etc.

As shown in FIG. 3, the camera application 311 and the third-party application 312 may be used to present underlying reported preview images (also referred to as preview frames) in a preview interface. The mobile phone 200 may include a plurality of cameras. Each of the cameras may be used to collect a preview frame. For convenience of illustration, the camera in the following description is understood to be a camera currently collecting the preview frame.

In this embodiment of this application, the application layer 310 may indicate an HAL layer 330 to start the camera based on a user operation, and the application layer 310 may further indicate the HAL layer 330 to perform a magnification operation on an image collected by the camera based on the user operation, or indicate the HAL layer 330 to enable/disenable a flashlight function.

A framework layer (Framework) 320 an application programming interface (application programming interface, API) and a programming framework for the application layer 310. The framework layer 320 includes some predefined functions. As shown in FIG. 3, the framework layer 320 may provide camera APIs, such as a camera API (API 1| API 2) 321, and camera service (Camera Service) 322.

The Camera API (API 1| API 2) 321 is used as an interface through which an underlying layer (for example, the HAL layer 330) interacts with the application layer 310. Specifically, the Camera API (API 1| API 2) 321 may receive a request from an upper layer (for example, the application layer 310) to turn on a specified camera and process the request through the camera service 322. In this embodiment of this application, the camera service 322 turns on the corresponding camera through the HAL layer 330 and obtains a preview frame, an identification frame, a metadata frame, etc., reported by the camera by using the HAL layer 330.

In this embodiment of this application, the camera service 322 may be used to obtain a strategy of dropping an identification frame based on the request from the application layer 310 and/or the identification frame reported by a lower layer (for example, the HAL layer 330). For example, the strategy of dropping an identification frame includes the following steps: The camera service 322 receives the identification frame reported by the HAL layer 330. A state of dropping (which may be understood as deleting) an unidentified identification frame is a state of error (error refers to an abnormality that an application does not have to process). The camera service 322 determines a state of the identification frame. In a case that the identification frame is in a state of error, the camera service 322 does not return the identification frame to the application. In a case that the identification frame is not in a state of error, for example, the state of the identification is not set, the camera service 322 returns the identification frame to the application layer 310 for identification processing.

The HAL layer 330 is used to connect the framework layer 320 and the kernel layer. For example, the HAL layer 330 may transmit data between the framework layer 320 and the kernel layer. Clearly, the HAL layer 330 may further process data from the underlying layer (that is, the kernel layer), and then transmit the data to the framework layer 320. In this embodiment of this application, the HAL layer 330 may process a preview frame, an identification frame, a metadata frame that are reported by the camera of the hardware layer, and return the identification frame and the preview frame to the camera service 322.

As shown in FIG. 3, the HAL layer 330 may include an HAL interface definition language (HIDL) interface 331, a camera hardware abstract layer (Camera Provider) 332, and an HAL interface. The camera hardware abstract layer 332 maintains normal communication with the upper layer by providing a standard HIDL interface to the upper layer (such as the camera service 322) for invoking. Moreover, the camera hardware abstract layer 332 controls the camera downwards through the standard HAL interface, such as HAL3.0, and obtains data such as the preview frame, the identification frame and the metadata frame that are reported by the camera.

In this embodiment of this application, the camera hardware abstract layer 332 may report the preview frame obtained, the identification frame having a set state to the upper layer (for example, the camera service 322).

In this embodiment of this application, the camera hardware abstract layer 332 includes a camera drive, which is different from a camera drive in the kernel layer. The camera drive in the camera hardware abstract layer 332 is used to set a state of the identification frame reported by the camera based on the illumination environment and the image quality, and report the identification frame having the set state and the preview frame together to the camera service 322.

The code scanning method according to this embodiment of this application may be implemented in the mobile phone 200 having the hardware structure and the software architecture.

Working procedures of software and hardware of the mobile phone 200 will be illustrated below in conjunction with a code scanning scene.

In a case that the touch sensor 280A receives a touch operation, a corresponding hardware interruption is transmitted to the kernel layer. The kernel layer processes the touch operation into an original input event (including information such as touch coordinates and a time stamp of the touch operation). The original input event is stored in the kernel layer. The framework layer 320 obtains the original input event from the kernel layer, and identifies a control corresponding to the input event. For example, in a case that the touch operation is a touch one-click operation and a control corresponding to the one-click operation is a control implementing a code scanning function in an interface of a third-party application 312, the third-party application 312 invokes the camera service 322 of the framework layer 320, and further invokes the camera drive through the camera service 322. The camera drive starts the camera 293 to collect the code scanning image, and a code scanning path is processed into a preview frame and an identification frame. Then, the camera 293 reports data such as a preview frame, an identification frame and a metadata frame to the camera drive of the HAL layer 330. The camera drive sets a frame drop flag (also referred to as state error, error, or state) for the identification frame reported by the camera 293 based on the illumination environment or the image quality, and reports the identification frame having the set frame drop flag and the preview frame together to the camera service 322. The camera service 322 receives the identification frame reported by the HAL layer 330, determines whether to return the identification frame to the third-party application 312 based on a result of whether the identification frame has a frame drop flag, and returns the preview frame at the same time. The third-party application 312 displays the preview frame in a preview box and processes information in the identification frame at the same time. In a case that the identification code is identified, the third-party application 312 transmits instructions of turning off the camera, the camera stops collecting data, and the third-party application 312 indicates the mobile phone 200 to perform a corresponding operation based on the identification code identified. The operation may be to open a web page or transmit unlocking instructions to a shared vehicle for example.

Figure 4:
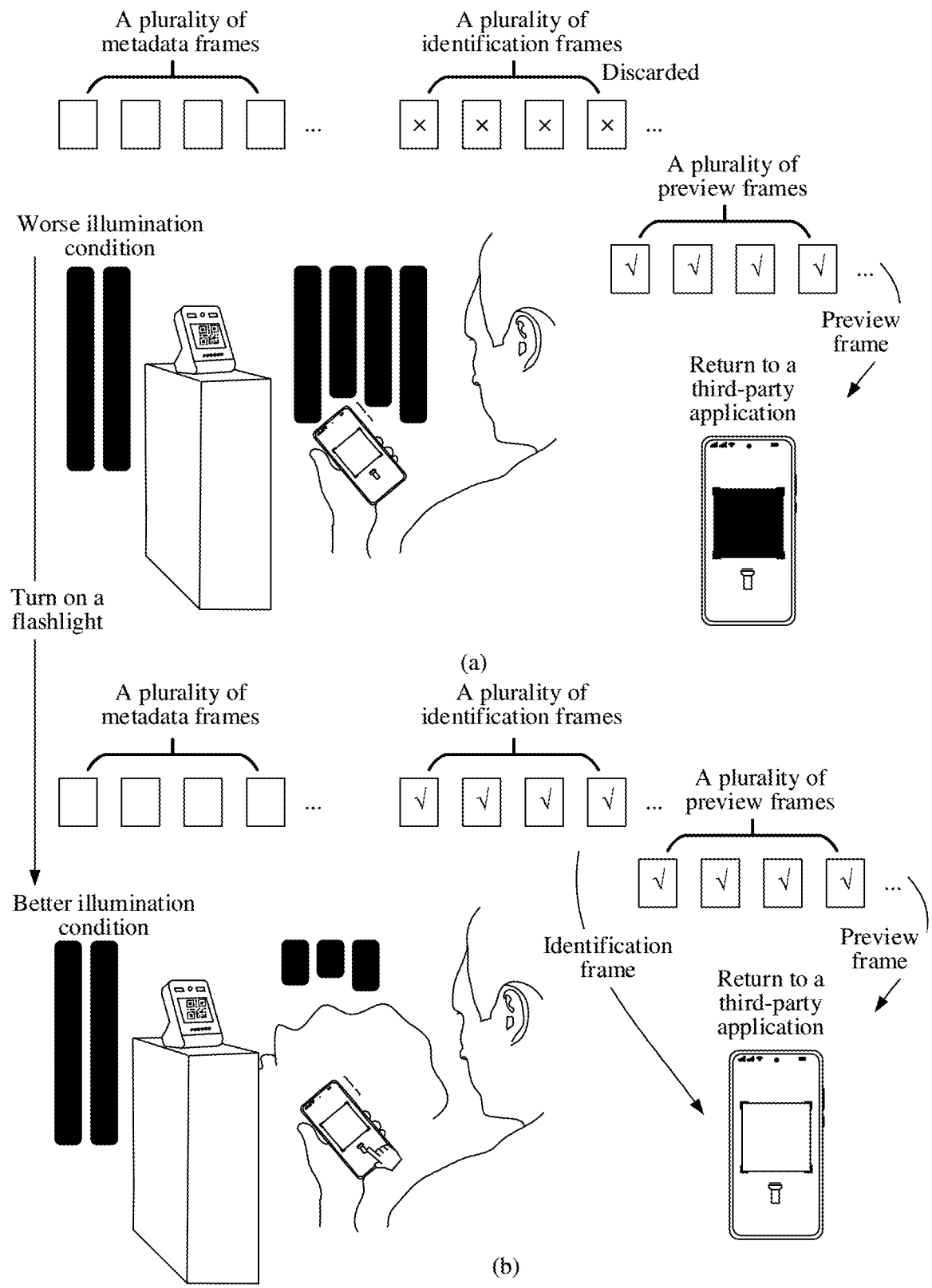
FIG. 4 shows a schematic diagram of a group of code scanning scenes according to an embodiment of this application.

FIG. 4 shows a schematic diagram of a group of code scanning scenes according to an embodiment of this application. As shown in (a) of FIG. 4, a user performs a code scanning operation in a case of a poor illumination condition, a camera 293 reports an identification frame, a preview frame, and a metadata frame to a camera drive, the camera drive determines that ambient light brightness is small based on the metadata frame, and the camera drive sets the identification frame in a state of error and reports the state of error and the preview frame together to camera service. The camera service determines not to report the identification frame to a third-party application based on the state error of the identification frame, such that the camera service only reports the preview frame to the third-party application. The third-party application displays the preview frame in a preview interface. In a case that the third-party application receives no identification frame, identification is not conducted, such that no invalid identification may be conducted. As shown in (b) of FIG. 4, in a case that the user enables a flashlight function of a mobile phone, brightness of a viewing environment rises, and the corresponding camera drive identifies the ambient light brightness as an excellent illumination condition based on the metadata frame. The camera drive does not set the identification frame in a state of error, and uploads the identification frame and the preview frame together to the camera service. The camera service determines that the identification frame needs to be reported to the third-party application based on the condition that the identification frame is not set in a state of error, such that the camera service reports the identification frame and the preview frame together to the third-party application. The third-party application displays the preview frame in the preview interface and identifies the identification frame until an identification code is identified. In the scene, the third-party application only identifies the identification frame collected in the scene of an excellent illumination condition, which greatly reduces a number of invalid identification frames (that is, identification frames under the poor illumination condition) required to be identified, such that a number of threads created for identification frames can be reduced, a space of a memory occupied by an identification process can be decreased, and identification time can be shortened. In this way, identification efficiency is improved.

Figure 5:
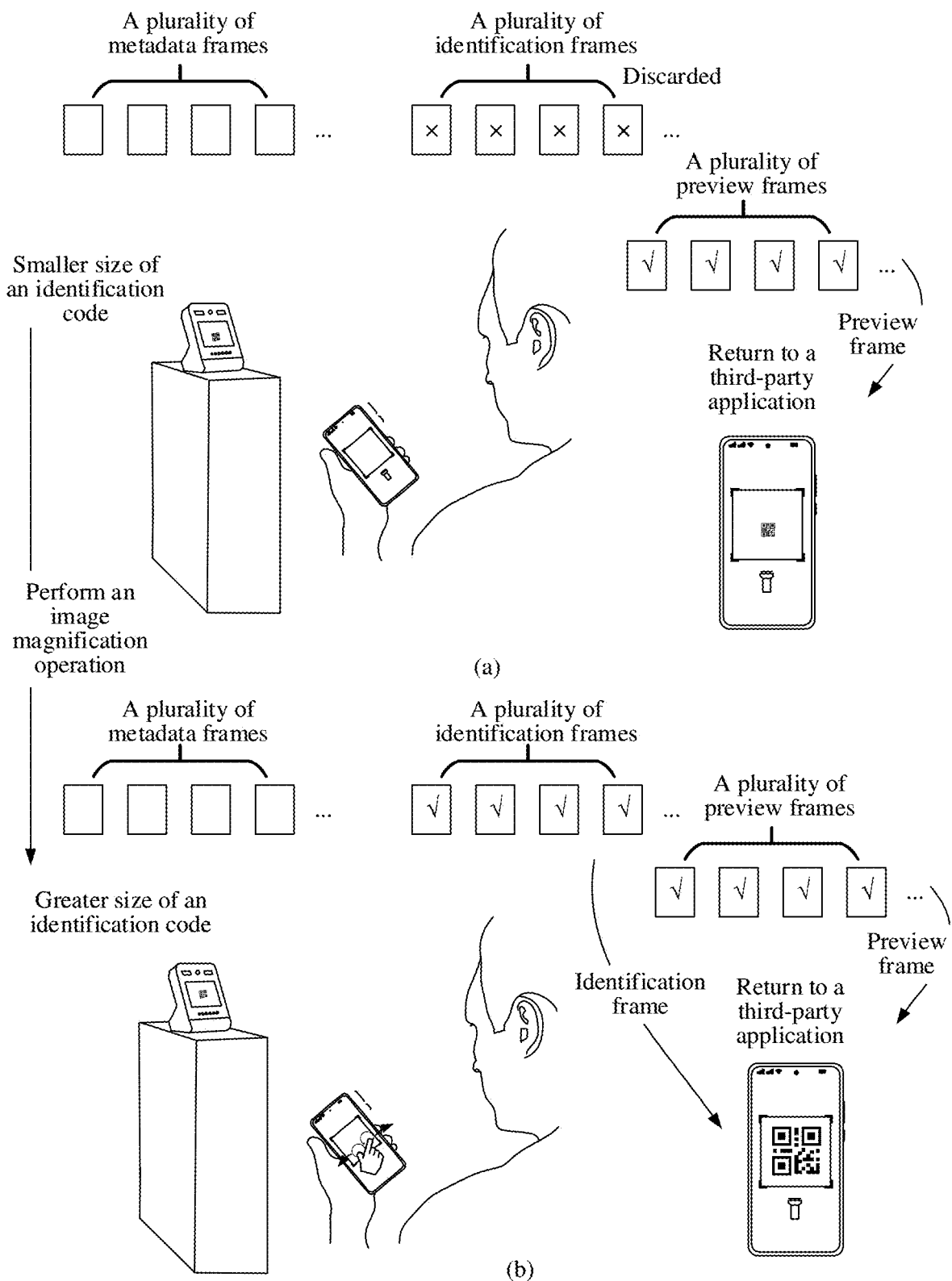
FIG. 5 shows a schematic diagram of another group of code scanning scenes according to an embodiment of this application.

FIG. 5 shows a schematic diagram of another group of code scanning scenes according to an embodiment of this application. As shown in (a) of FIG. 5, a user performs a code scanning operation, and an identification code displayed in a preview interface is small. That is, a size of the identification code in an image collected by a camera is too small, which causes low image quality. Therefore, a camera drive marks states of identification frames by not marking an identification frame by which identification frames are spaced and making states of two consecutive identification frames as error. Accordingly, camera service uses a frame drop strategy of dropping two identification frames and reporting one identification frame to a third-party application. As shown in (b) of FIG. 5, the user performs an image magnification operation, the third-party application transmits an image magnification request to the camera drive, the camera drive stops marking the state of the identification frame and directly uploads the identification frame and a preview frame to the camera service, and the identification frame and the preview frame are returned to the third-party application by using the camera service. The third-party application identifies consecutive identification frames. In the scene, the third-party application first conducts frame skip identification on the identification frame, to avoid identifying identification frames having low image quality and wasting computing resources. In response to detecting that the user performs the image magnification operation, the camera drive determines that the image quality becomes high (the identification code in the image is changed from smaller to larger), and marking of the state of the identification frame is stopped. The third-party application conducts consecutive frame identification on the preview frame. Based on the above description, the third-party application only consecutively identifies the identification frame collected in a scene of high image quality, which greatly reduces a number of invalid identification frames (that is, identification frames under the low image quality) required to be identified, such that a number of threads created for identification frames can be reduced, a space of a memory occupied by an identification process can be decreased, and identification time can be shortened. In this way, identification efficiency is improved.

A code scanning method according to embodiments of this application will be described in detail below in conjunction with a flow diagram of the method shown in FIG. 6.

S601. A target application displays, in response to an operation of turning on a camera by a user, a code scanning interface and transmits a request to start the camera to camera service.

Before S601, the target application may receive the operation of turning on the camera by the user. The target application may be a camera application or a third-party application.

In some embodiments, the operation of turning on the camera includes an operation of triggering a mobile phone to run a camera application in background. For example, the operation of turning on the camera is to enter a code scanning interface 603a after the user clicks on an icon 602a in a main interface 601a of the mobile phone shown in (a) of FIG. 6A.

Alternatively, the operation of turning on the camera includes an operation of triggering the mobile phone to use the camera to enable a code scanning function while running a third-party application in the background. With Alipay™ as the third-party application as an example, a function of using the camera may be an operation of clicking on a "scan 602b" icon in a main interface 601b of the third-party application shown in (a) of FIG. 6B. In response to detecting the operation, the mobile phone enables the code scanning function of the third-party application, and the mobile phone displays a code scanning interface 603b shown in (b) in FIG. 6B.

In some other embodiments, the operation of turning on the camera includes an operation of switching a photographing mode. In functions of the camera used by the camera application or the third-party application, a plurality of photographing modes such as photographing, video recording, panorama, code scanning, and identification may be provided. For example, in a case that the operation of turning on the camera is to switch the photographing mode of the camera application to a code scanning mode, the camera application may be switched to the code scanning mode through an operation of selecting a code scanning 604a icon in an entered main interface of the camera application shown in (b) of FIG. 6A. The icon 602a is an application icon of the camera application and the code scanning 604a is a function icon of the code scanning function of the camera application.

After an application receives the above operation of turning on the camera by the user, the application may invoke a camera interface (for example, an open Camera interface), to ask to start the camera, that is, transmit a request to start the camera to the camera service. The request to start the camera carries function parameters used to indicate a camera type and a photographing mode, such that an underlying layer may be explicitly indicated to start the corresponding camera to satisfy a corresponding function requirement. In some embodiments, the request to start the camera further includes an application identifier. The application identifier is used to enable the camera drive to determine whether an application starting the camera is a preset target application.

S602. The camera service transmits, in response to receiving the request to start the camera, a request to invoke a camera drive to the camera drive.

Before S602, the camera service may receive the request to start the camera from the target application.

In this embodiment, the camera service receives the request to start the camera and transmits a message to the camera drive of the underlying layer, to indicate the camera drive to drive the camera to be started.

S603. The camera drive starts, in response to receiving the request to invoke the camera drive, the camera and obtains a metadata frame, an identification frame, and a preview frame.

Before S603, the camera drive may receive the request to invoke the camera drive from the camera service.

In this embodiment, after receiving the request to invoke the camera drive, the camera drive may control the camera to be turned on. Once the camera is turned on, code scanning images may be continuously collected and processed into identification frames and preview frames, and metadata frames are output. A preview image in the code scanning interface may be implemented by reporting the preview frame to an upper layer with the camera. A code scanning identification result (also referred to as an identification result) may be implemented by identifying the identification code.

S604. The camera reports the metadata frame, the identification frame and the preview frame to the camera drive.

It should be noted that in practical application, what are reported from the camera to the camera drive are a metadata stream, an identification stream, and a preview stream. In a case that the step is illustrated with one frame of metadata, one identification image and one preview image collected by the camera at a particular moment as an example, the frame of metadata collected is the metadata frame, the one identification image collected is the identification frame, and the one preview image collected is the preview frame.

The metadata frame is used to describe a value of an image collected by the camera at a moment. For example, the metadata frame includes a frame rate, an image size, codes, a color bit depth, ambient light brightness, etc. Both the identification frame and the preview frame are image data (corresponding to the above YUV data), and the image data may be displayed on the display screen of the mobile phone or may be used for identification processing, to obtain an identification code in the image data. A value of the image data may be obtained from the metadata frame describing a camera collection parameter of the image data at a collection time stamp. For example, the mobile phone may determine an illumination environment (also referred to as ambient light brightness) when the camera collects the preview frame and the identification frame based on an illumination intensity in the metadata frame.

The metadata frame, the identification frame and the preview frame are all cached in a memory block, such that the identification frame or the preview frame may be processed before being rendered to a screen. Therefore, the metadata frame, the identification frame and the preview frame may occupy a memory space, and may influence an identification speed when available memory capacity is small.

S601 to S604 may be processed based on a procedure of turning on the camera to collect raw data and reporting a preview image, an identification image and metadata in the conventional technology, which will not be repeated herein.

S605. The camera drive identifies ambient light brightness based on the metadata frame.

In this embodiment, the ambient light brightness is indicated by the illumination intensity parameter. The illumination intensity parameter includes: Luxindex (also referred to as an illumination intensity, and illuminance for short). For example, the ambient light brightness is a reciprocal of Luxindex, that is, 1/Luxindex. A greater value of Luxindex indicates smaller ambient light brightness and a darker code scanning scene. A smaller value of Luxindex indicates greater ambient light brightness and a brighter code scanning scene.

The camera drive may obtain the illumination intensity from the metadata frame, such that the ambient light brightness of the identification frame and the preview frame obtained by processing the code scanning image corresponding to the metadata frame may be determined. The ambient light brightness is used to determine whether an illumination environment is excellent or poor.

S606. The camera drive determines that the ambient light brightness of the metadata frame is smaller than a threshold, and sets a frame drop flag for the identification frame collected at the same time stamp as the metadata frame.

In a case that the ambient light brightness of the metadata frame is smaller than the threshold, the illumination environment of the identification frame and the preview frame is a dark scene, such that the camera drive sets a frame drop flag for the identification frame collected at the same time stamp as the metadata frame, to indicate camera service of an upper layer to drop the identification frame. The identification frame dropped by the camera service is not identified by the target application of the upper layer, such that the target application of the upper layer does not need to allocate threads to invalid frames and identify two-dimensional codes in the invalid frames. In this way, waste of computing resources of the device caused by a great amount of invalid identification can be avoided.

Further, the frame drop flag may be a state of the identification frame. For example, in a case that the state is error, the identification frame is an invalid identification frame that needs to be dropped. In a case that the state is not error, and for example, the state is null (NULL) or not set, the identification frame is an identification frame that needs to be identified. It should be understood that the operation of setting the frame drop flag for the invalid identification frame by the camera drive has advantages that the camera service of the upper layer may determine whether to upload the identification frame to the target application based on the frame drop flag. Therefore, in some embodiments, an identification frame flag may also be a pair of marks indicating different meanings, such as (Y/N) and (1/0). The frame drop flag may be N, or 0, and a flag indicating no frame drop may be Y, or 1.

S607. The camera drive reports the identification frame and the preview frame to the camera service.

The identification frames reported include identification frames having the set frame drop flags and identification frames having no frame drop flags set. That is, the identification frame obtained by the camera service is an image processed by the camera drive based on analysis of the ambient light brightness, such that the camera service may detect whether the identification frame is marked after receiving the identification frame, that is, S608 is performed.

S608. The camera service detects whether the identification frame is marked, and returns the preview frame and the identification frame including no mark to the target application.

Based on the above description, the preview frame is used to be displayed in the code scanning interface. The identification frame is used to obtain information of the identification code. That is, whether the preview frame is dropped is perceived by the user, and code scanning experience of the user cannot be influenced regardless of whether the identification frame is dropped. Therefore, when code scanning is conducted in a dark environment, a number of preview frames uploaded from the camera service to the target application in this embodiment is consistent with that of preview frames reported by the camera, and a number of identification frames uploaded is smaller than that of identification frames reported by the camera. Therefore, a number of identification frames to be identified by the target application can be reduced without influencing normal preview of the image collected by the camera in the code scanning interface, such that a number of threads created for identification frames can be reduced, a space of a memory occupied by an identification process can be decreased, and identification time can be shortened. In this way, identification efficiency is improved.

In some embodiments, the camera service detects whether the identification frame is marked as follows: the camera service detects whether the identification frame is in a state of error, and in a case that the identification frame is in a state of error, the identification frame is marked. Then, the identification frame including no error is returned to the target application.

In some other embodiments, the camera service detects whether the identification frame is marked as follows: the camera service detects whether the identification frame is marked as "N (or 0)", and in a case that the identification frame is marked as "N (or 0)", the identification frame is marked. In a case that the identification frame is not marked as "N (or 0)", and for example, the identification frame is not marked as "Y (or 1)", the identification frame is not marked. Then, the camera service returns the identification frame including no "N (or 0)" to the target application.

After the camera service returns the preview frame and the identification frame including no mark, the target application receives the preview frame and the identification frame including no mark. Then, the target application performs S609 to identify a two-dimensional code.

S609. The target application displays the preview frame in the code scanning interface, identifies the identification frame, and determines an identification result.

In S609, in a case that an identification result of a current frame is that no two-dimensional code is identified, the target application continues to receive a next preview frame and a next identification frame including no mark, and identifies the next identification frame, to determine whether the two-dimensional code is identified. In a case that the target application identifies the two-dimensional code from the identification frame, the target application transmits a request to turn off the camera to the camera service. For example, the target application invokes a camera interface (for example, a close Camera interface), to ask to turn off the camera and transmit a request to turn off the camera to the camera service. After receiving the request to turn off the camera, the camera service transmits the request to turn off the camera to a lower layer, turns off the corresponding camera, and finally stops preview in the code scanning interface.

In summary, when code scanning is conducted in a dark environment through the method of this embodiment, the camera drive may drop the identification frame in the camera service by setting the frame drop flag for the identification frame collected in a dark environment, such that invalid identification frames identified in the dark environment are not included in identification frames reported by the camera service to the target application. In this way, problems of wasting computing resources of devices and reducing a code scanning speed due to identifying an invalid frame by the target application can be resolved, such that code scanning efficiency is improved.

Figure 6:
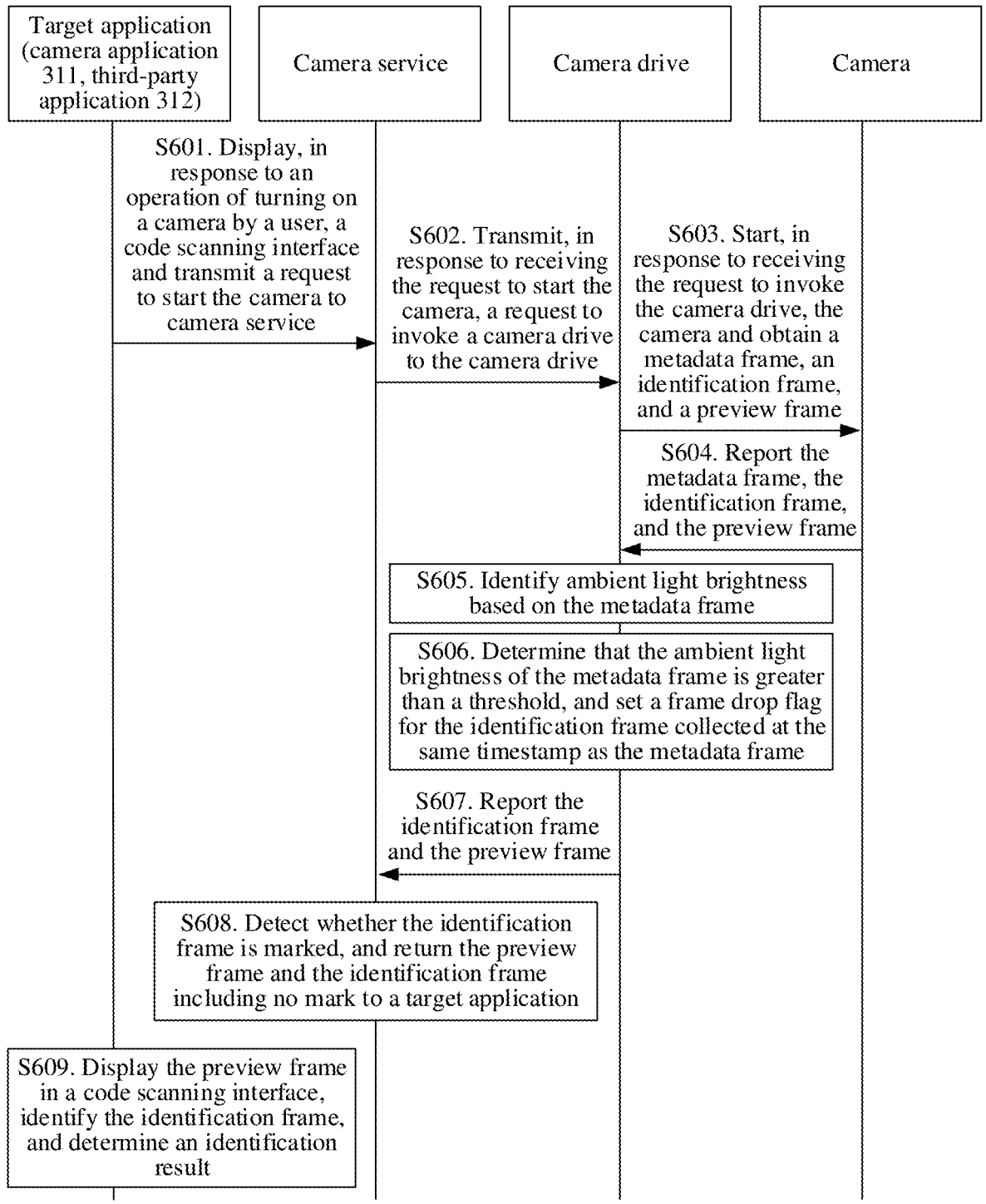
FIG. 6 shows an interaction diagram of a code scanning method according to an embodiment of this application.
Figure 6A:
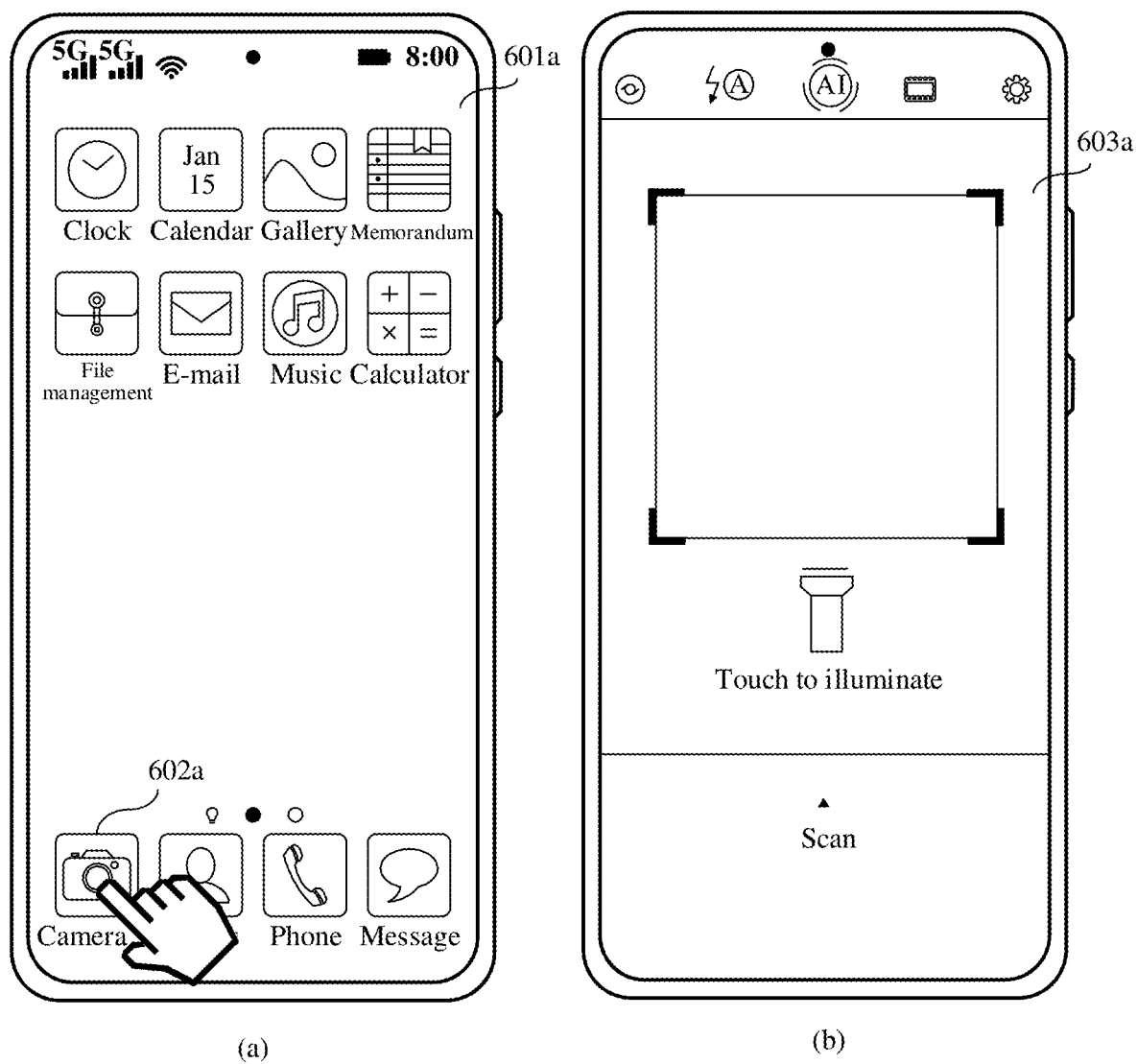
FIG. 6A shows a schematic diagram of an operation of turning on a camera according to an embodiment of this application.
Figure 6B:
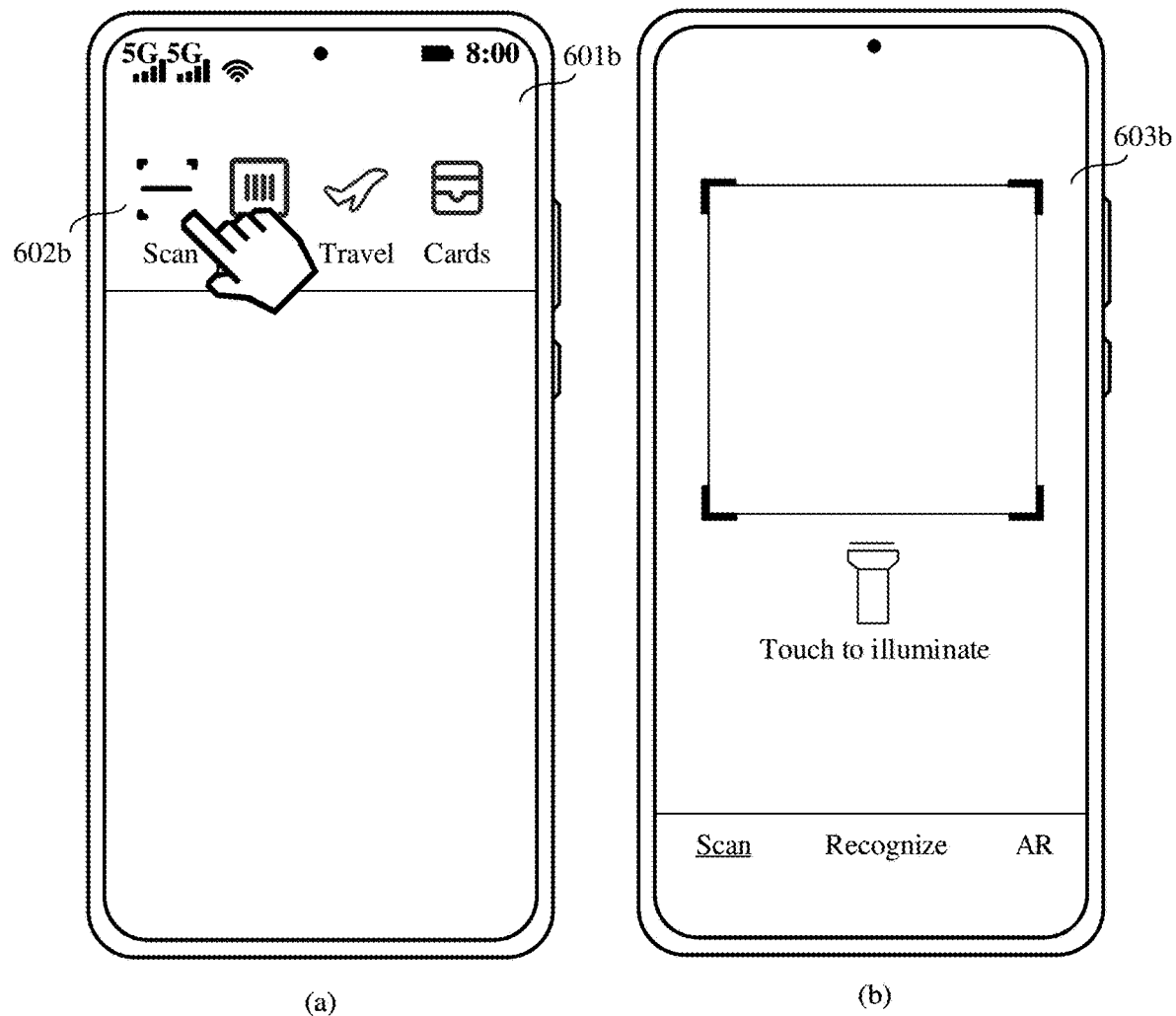
FIG. 6B shows a schematic diagram of another operation of turning on a camera according to an embodiment of this application.

The embodiment shown in FIG. 6 only identifies the identification frame at ambient light brightness greater than or equal to the threshold. In an actual code scanning scene, when the user conducts code scanning in the dark environment, the camera may conduct auto-exposure and auto-focus, such that brightness and sharpness of the collected image tend to be normal. In an auto-exposure and auto-focus process of the camera, the situation that the target application still fails to identify a two-dimensional code from the identification frame in a case that an ambient light brightness value is greater than or equal to the threshold may occur. However, in view of the situation, the above embodiment reports the identification frame to the target application for identification, which leads to a great amount of identification of invalid frames by the target application, and causes waste of computing resources of the device.

Based on the above description, an embodiment of this application further provides another code scanning method, which can effectively reduce identifying invalid frames by a target application and improve a code scanning speed based on the embodiment shown in FIG. 6.

With reference to FIG. 7A(1) and FIG. 7A(2), after S606, the code scanning method according to this embodiment of this application may include the following steps:

S701. A camera drive determines that ambient light brightness of a metadata frame is greater than or equal to a threshold, and obtains a first convergence result of auto-exposure and a second convergence result of auto-focus from the metadata frame.

Based on the above description, a camera normalizes brightness of an object photographed through auto-exposure. In an auto-exposure process, aperture, shutter, international standards organization (international standards organization, ISO), etc., of the camera are adjusted stepwise. That is, the aperture, the shutter, the ISO, etc., of the camera are adjusted within a period of time, which is referred to as an adjustment process. The auto-exposure of the camera is in a convergence state in the adjustment process. In a case that adjustment ends, the aperture, the shutter, the ISO, etc., of the camera remain unchanged, such that the auto-exposure is in a convergence end state.

Similarly, the camera normalizes sharpness of the object photographed through auto-focus. In an exposure process of the camera, the brightness of the object is changed from dark to light, such that an image photographed by the camera is changed from a blurred state to a clear state through the auto-focus of the camera. In a focal length adjustment process of the camera, a focal length does not reach a target value, such that the auto-focus is in the convergence state. When the camera ends focal length adjustment, the focal length reaches the target value, such that the auto-focus is in the convergence end state.

Based on the above description, the metadata frame is further used to provide photographing device parameters (also referred to as camera parameters), such that the camera drive may determine the first convergence result of the auto-exposure and the second convergence result of the auto-focus.

In some embodiments, the camera parameters include: AEdone, and AFdone. AE is also referred to as auto-exposure (auto exposure), and AEdone indicates that the auto-exposure is in the convergence end state. AF is also referred to as auto-focus, and AFdone indicates that the auto-focus is in the convergence end state. That is, in this embodiment, the camera drive determines that ambient light brightness of the metadata frame is greater than or equal to a threshold, and obtains AEdone and AFdone from the metadata frame. In a case that AEdone is obtained, the auto-exposure is in the convergence end state. In a case that AFdone is obtained, the auto-focus is in a focus end state. The camera drive may determine the first convergence result of the auto-exposure and the second convergence result of the auto-focus by determining whether AEdone and AFdone are identified.

In some other embodiments, the camera parameters include the aperture, the shutter, the ISO, the focal length, etc., of the camera. The camera drive obtains camera parameters of at least two metadata frames, and determines whether the camera parameters are changed, to determine whether the auto-exposure or the auto-focus is in the convergence state. That is, the first convergence result of the auto-exposure and the second convergence result of the auto-focus are determined.

S702. The camera drive determines that the auto-exposure and/or the auto-focus are/is in a convergence state based on the first convergence result and the second convergence result, and sets the frame drop flag for the identification frame collected at the same time stamp as the metadata frame according to a frame drop strategy.

Refer to the above description of the frame drop flag in S606 for a setting mode of the frame drop flag, which will not be repeated herein.

The frame drop strategy of this embodiment will be emphatically introduced below.

In an auto-exposure and auto-focus process of the camera, the situation that the target application still fails to identify a two-dimensional code from the identification frame in a case that an ambient light brightness value is greater than or equal to the threshold may occur. Therefore, identifying the identification frames collected in the auto-exposure and auto-focus process may lead to problems that a two-dimensional code cannot be identified from an invalid frame and thread resources are occupied. Based on the above description, the identification frames collected in the auto-exposure and auto-focus process are dropped, such that a number of threads created for the identification frames can be reduced, a space of a memory occupied by an identification process can be decreased, and identification time can be shortened. In this way, identification efficiency is improved.

It should be understood that any one or more identification frames collected in the auto-exposure and auto-focus process of the camera are dropped, such that a number of threads created for the identification frames can be reduced. In this embodiment, three frame drop strategies are proposed as follows.

A first frame drop strategy includes the following step: All identification frames collected in a case that auto-exposure and/or auto-focus are/is in a convergence state are dropped.

In this way, according to the frame drop strategy, a camera drive sets a frame drop flag for an identification frame in a case that auto-exposure and/or auto-focus are/is in the convergence state.

A second frame drop strategy includes the following step: With T as a frame drop periodicity, N identification frames are dropped in each frame drop periodicity.

In this way, according to the frame drop strategy, a camera drive sets frame drop flags for the N identification frames in the frame drop periodicity T.

For example, T is 3 frames and N is 2. That is, two identification frames in every three identification frames are dropped, and only one identification frame is reserved for identifying a target application.

For example, the frame drop strategy includes the following step: In every three identification frames, an identification frame is reserved and the other two consecutive identification frames are dropped, which are conducted in a cyclic manner.

A third frame drop strategy includes the following step: The first M identification frames collected in a case that auto-exposure and/or auto-focus are/is in a convergence state are dropped. For example, M is 3, 6, 10, 15, 20, etc.

In this way, according to the frame drop strategy, a camera drive sets frame drop flags for the first M identification frames in a case that auto-exposure and/or auto-focus are/is in the convergence state.

S703. The camera drive determines that the auto-exposure and the auto-focus are both in a convergence end state based on the first convergence result and the second convergence result, and end an operation of setting the frame drop flag for the identification frame according to the frame drop strategy.

In a case that the auto-exposure and the auto-focus are both in the convergence end state, the camera parameters in the metadata frame may include AEdone and AFdone. Alternatively, in a case that the auto-exposure and the auto-focus are both in the convergence end state, the camera parameters in the metadata frame may remain unchanged compared with a previous frame.

It should be understood that the camera drive may repeatedly end the operation of setting the frame drop flag for the identification frame according to the frame drop strategy in a code scanning process. Each end operation may be described in such a way that "a camera drive ends an operation of setting a frame drop flag for an identification frame according to a frame drop strategy".

In some embodiments, the camera drive ends the operation of setting the frame drop flag for the identification frame according to the frame drop strategy, such that the camera drive no longer sets frame drop flags for all identification frames received later. In this way, the camera drive ends the operation of setting the frame drop flag for the identification frame according to the frame drop strategy only once.

In some other embodiments, after the camera drive ends the operation of setting the frame drop flag for the identification frame according to the frame drop strategy, the camera drive no longer sets the frame drop flags for the identification frames received later. The camera drive continues to set frame drop flags for the identification frames received later until the identification frames satisfy a preset condition. For example, the preset condition includes: Luxindex is smaller than a threshold. For example, when the user conducts code scanning in a dark environment, in a case that the user enables a flashlight function of the mobile phone, Luxindex is greater than or equal to the threshold, and the camera conducts auto-exposure and auto-focus. In an auto-exposure and auto-focus process, the camera drive sets the frame drop flag for the identification frame according to the frame drop strategy. In a case that the auto-exposure and the auto-focus are both in a convergence end state, the camera drive ends an operation of setting the frame drop flag for the identification frame according to the frame drop strategy. In a case that the user mistouches the mobile phone to disenable the flashlight function and Luxindex rises to be greater than a preset value, the camera drive continues to set a frame drop flag for an identification frame having Luxindex greater than the preset value. That is, in the scene, a frame drop process performed by the camera drive is as follows: Firstly, all identification frames having Luxindex greater than the preset value are dropped; identification frames are dropped according to the frame drop strategy (for example, in every three identification frames, an identification frame is reserved and the other two consecutive identification frames are dropped); then, after auto-exposure and auto-focus are completed, frame drop is ended; and finally, in a case that Luxindex rises to be greater than a preset value, all identification frames having Luxindex greater than the preset value are continuously dropped.

After setting the frame drop flag for the identification frame, the camera drive reports the identification frame and the preview frame to the camera service, such that the camera service may perform a frame drop operation based on the frame drop flag. Refer to the above description of S607 for the frame drop operation performed by the camera service. Based on the above description, after performing S703, the mobile phone performs S607.

In summary, through the method of this embodiment, the camera drive may set the frame drop flag for the identification frame corresponding to the ambient light brightness smaller than the threshold, and may set the frame drop flag for the identification frame in the convergence state when the ambient light brightness is greater than or equal to the threshold, which can reduce a number of identification frames uploaded from the camera service to the target application, such that a number of threads created for identification frames by the target application can be reduced, a space of a memory occupied by an identification process can be decreased, and identification time can be shortened. In this way, identification efficiency is improved.

Figure 7B:
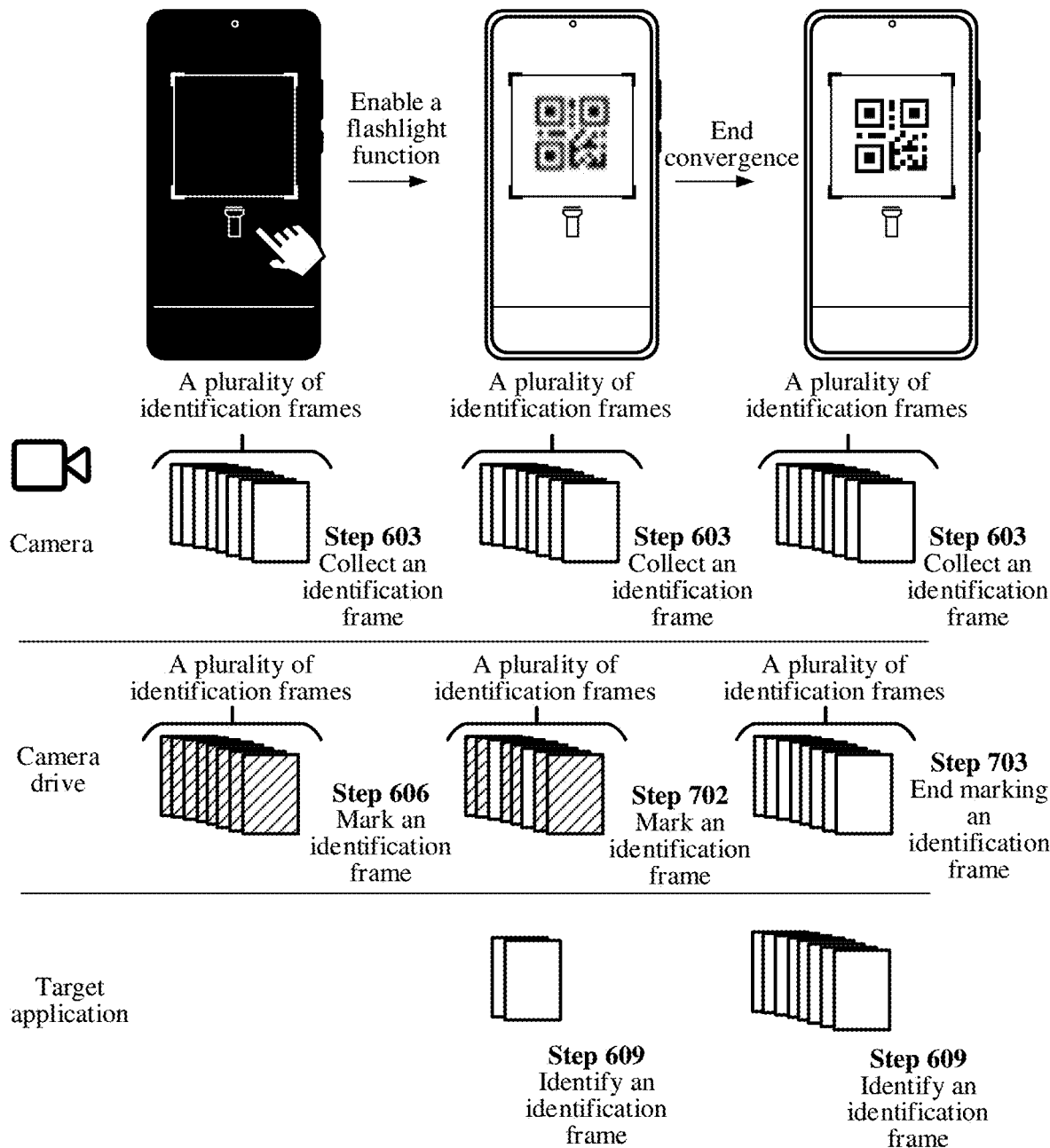
FIG. 7B shows a schematic effect diagram corresponding to another code scanning method according to an embodiment of this application.

For example, as shown in FIG. 7B, through the method of this embodiment, in a case that code scanning is conducted in a dark environment, a plurality of identification frames collected by the camera in a scene of small screen brightness (that is, great Luxindex) are all dropped. In a case that the screen brightness becomes greater (that is, Luxindex is small), in the auto-exposure and auto-focus process of the camera, the camera drive marks two identification frames to be dropped with an interval of one identification frame. When the camera ends auto-exposure and auto-focus, the camera drive no longer marks the identification frame. In this way, a number of identification frames identified by the target application is much smaller than that of identification frames collected by the camera. Therefore, the identification speed is high, time consumed by a code scanning process that may be perceived by the user is short, and the user has excellent code scanning experience.

In the above embodiment shown in FIG. 6, the metadata frame does not need to be processed by hardware after the camera is started, and the preview frame and the identification frame need to be processed by hardware. For example, the hardware needs to crop or beautify an image, such that a number of the metadata frames is three greater than that of the identification frames.

Based on the above description, after the camera drive obtains the metadata frame, the first three data frames are dropped, and ambient light brightness of each metadata frame starts to be identified from a fourth data frame. Then, the camera drive determines metadata information of a first identification frame based on ambient light brightness of a fourth metadata frame. That is, in this embodiment, an $i^{th}$ identification frame corresponds to an $(i+3)^{th}$ metadata frame. The camera drive obtains metadata information corresponding to the identification frame based on a correspondence, to determine ambient light brightness.

Figure 8A:
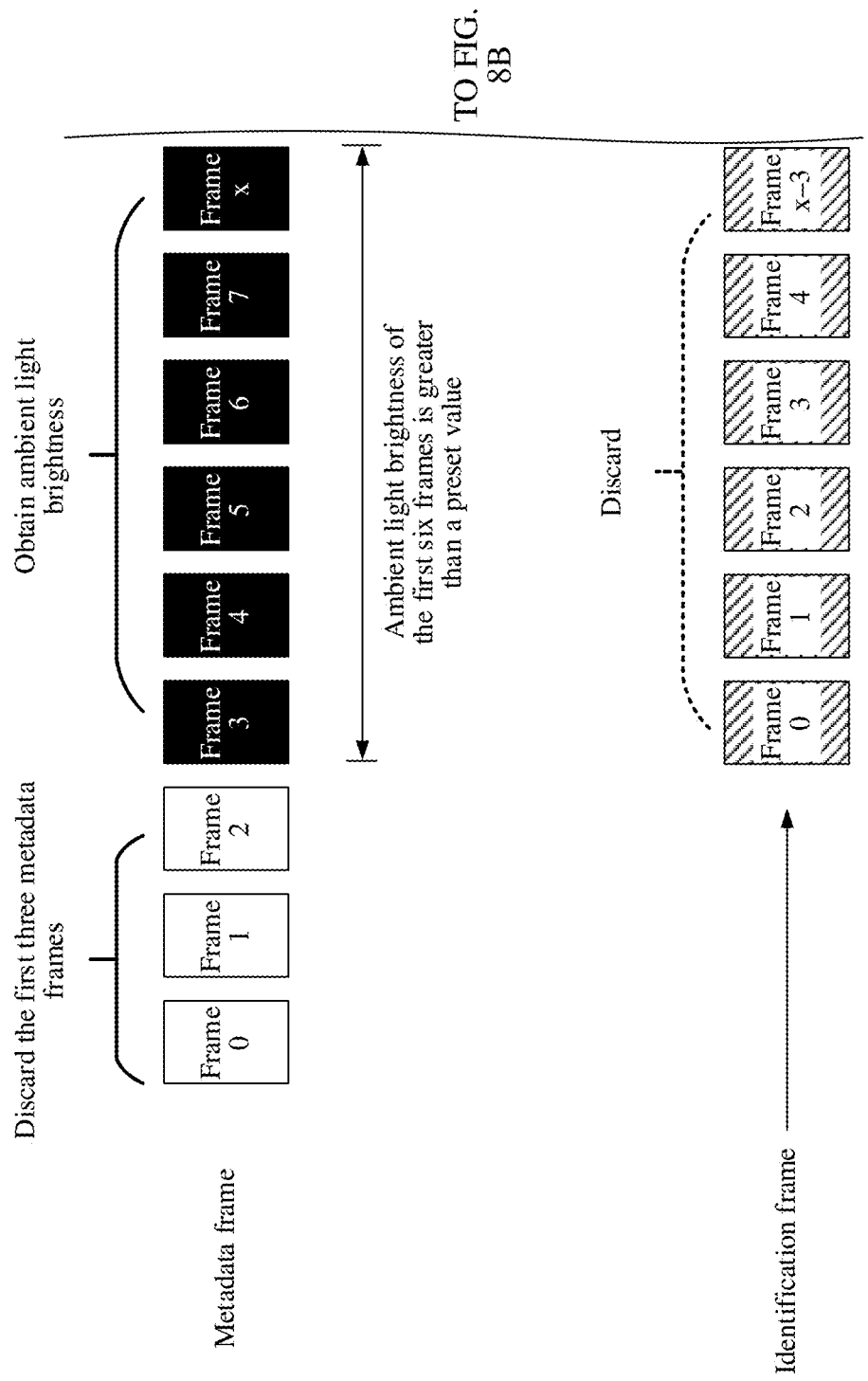
FIG. 8A and FIG. 8B show a schematic effect diagram corresponding to yet another code scanning method according to an embodiment of this application.
Figure 8B:
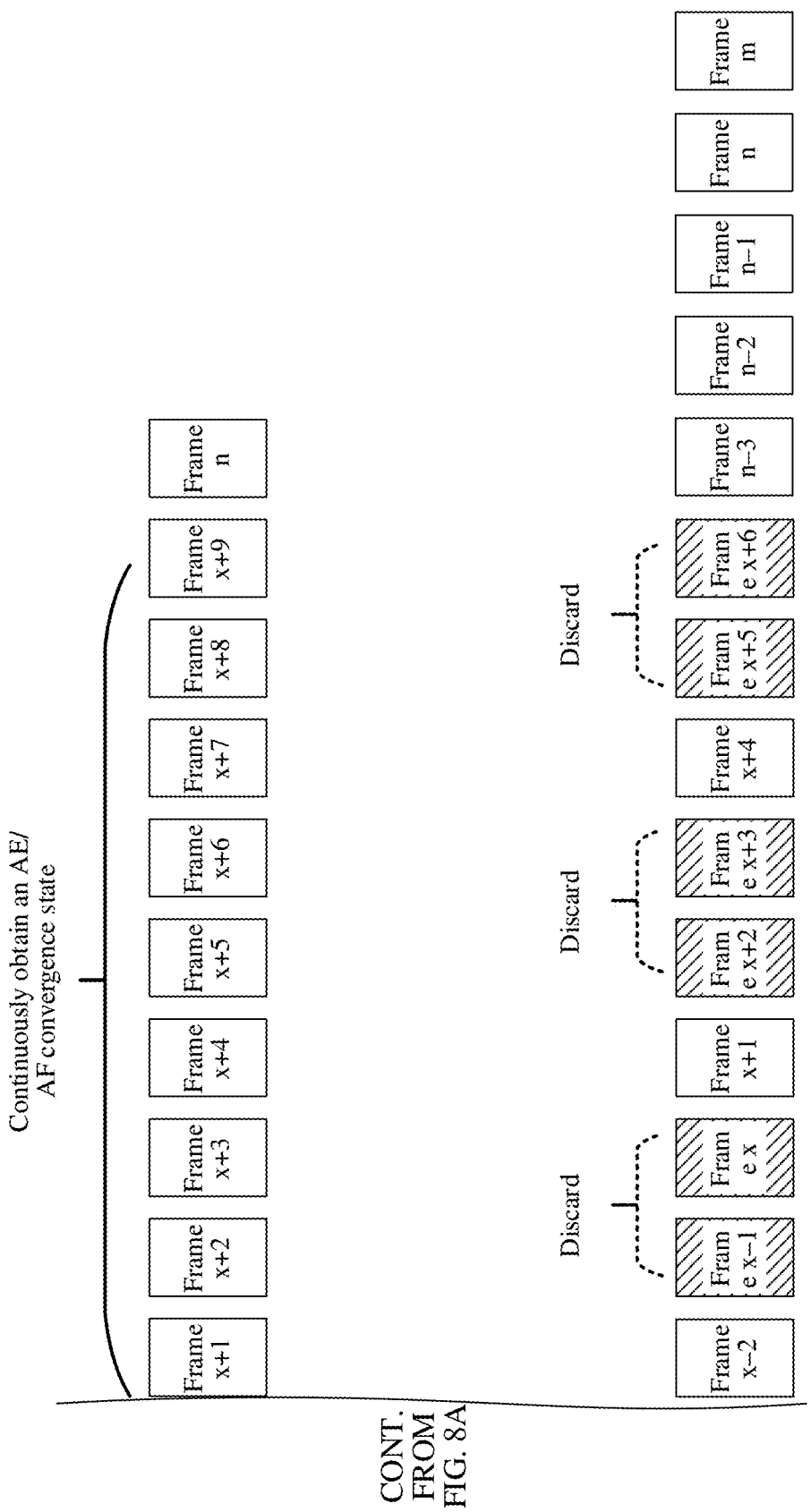

For example, as shown in FIG. 8A and FIG. 8B, through the method of this embodiment, the first three metadata frames are dropped, metadata information, such as Luxindex, is obtained from a fourth metadata frame, and ambient light brightness is determined based on the metadata information. Ambient light brightness of the first six identification frames is smaller than the threshold, such that the identification frames are dropped. From a seventh frame, it is detected that the camera is in an AE convergence state or an AF convergence state based on the metadata frame, such that at-intervals frame drop is conducted. In response to detecting that the camera ends AE convergence and AF convergence based on the metadata frame, at-intervals frame drop is stopped, and each identification frame is uploaded to the target application.

In another scene, when code scanning is conducted with the mobile phone, an image collected by the camera has low quality, and for example, a size of an identification code in the image is too small. Alternatively, a code scanning pose tilts, which changes an identification code zone in the image into a non-rectangular zone and further influences image quality.

Based on the above description, an embodiment of this application further provides another code scanning method, which can effectively shorten identification time in a case of low image quality during code scanning based on the embodiment shown in FIG. 6.

Figure 9A:
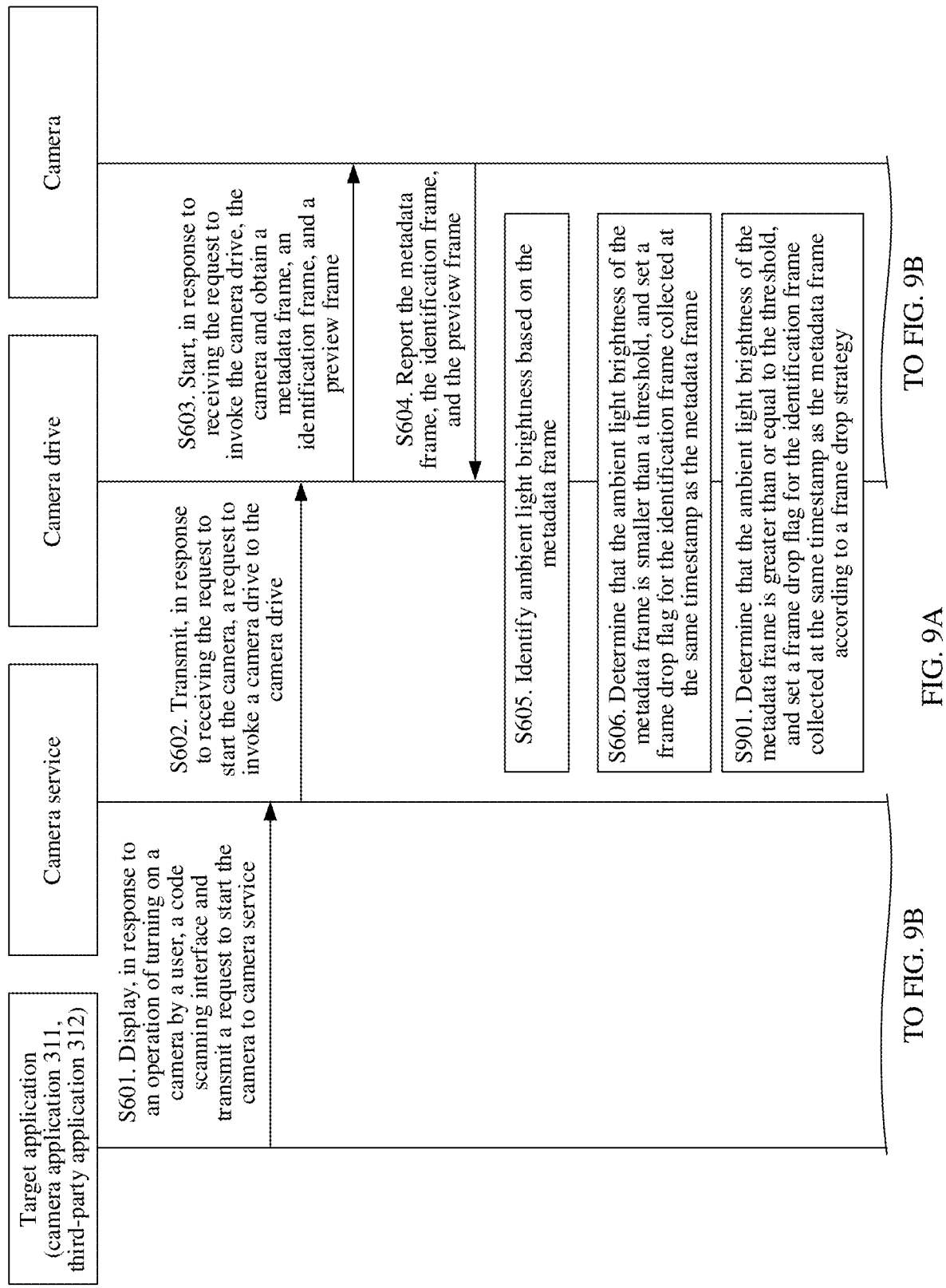
FIG. 9A and FIG. 9B show an interaction diagram of yet another code scanning method according to an embodiment of this application.
Figure 9B:
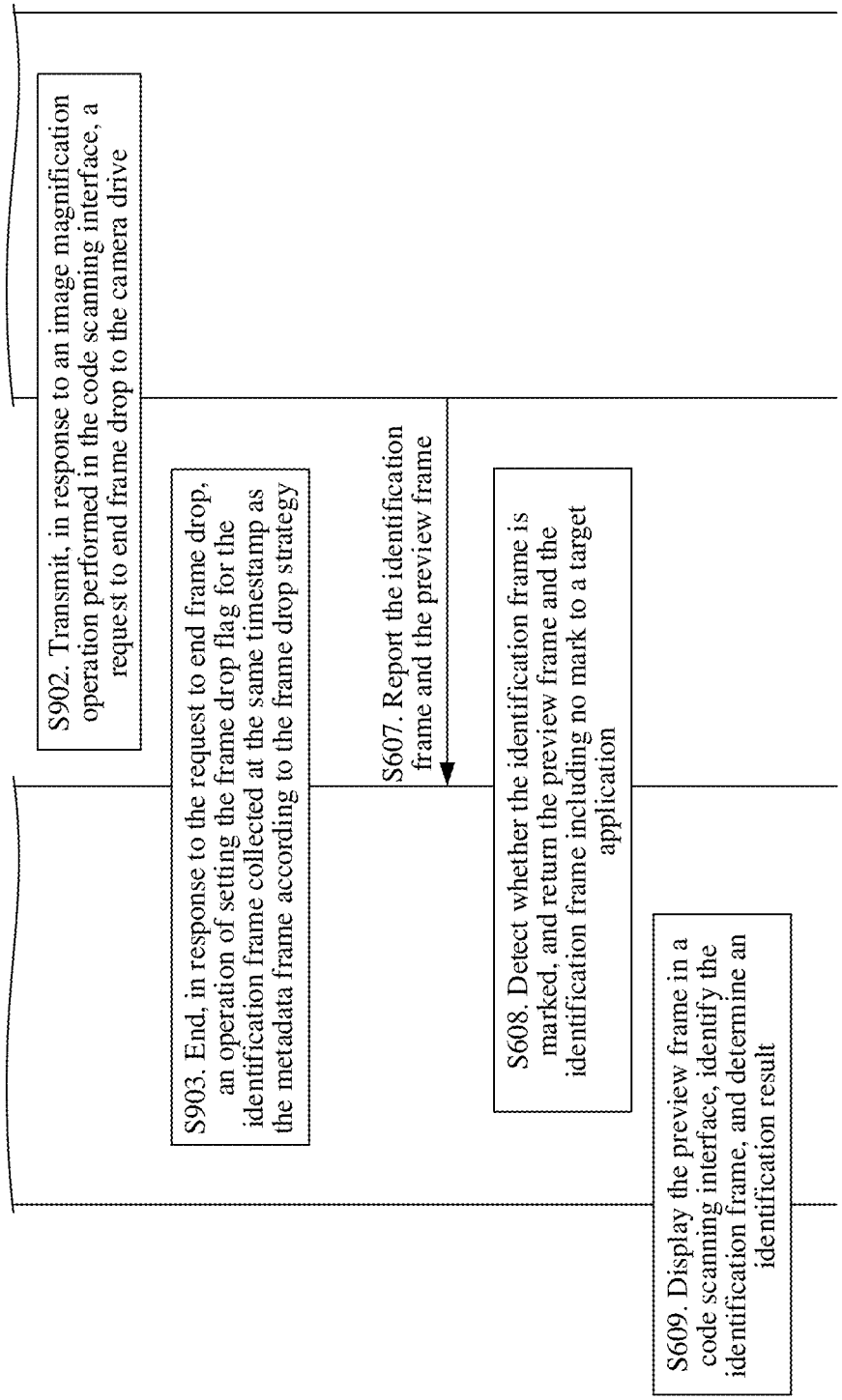

With reference to FIG. 9A and FIG. 9B, after S606, the code scanning method according to this embodiment of this application may include the following steps:

S901. The camera drive determines that the ambient light brightness of the metadata frame is greater than or equal to the threshold, and sets a frame drop flag for the identification frame collected at the same time stamp as the metadata frame according to a frame drop strategy.

Refer to the above description of the frame drop strategy in S702 for the frame drop strategy, which will not be repeated herein.

In some embodiments, the frame drop strategy in S901 and the frame drop strategy in S702 are two different strategies. For example, S702 sets the frame drop flag for the identification frame through at-intervals frame drop, and S901 sets frame drop flags for all identification frames.

In some other embodiments, the frame drop strategy in S901 and the frame drop strategy in S702 are two same strategies. For example, both S702 and S901 set the frame drop flag for the identification frame through at-intervals frame drop.

S902. The target application transmits, in response to an image magnification operation performed in the code scanning interface, a request to end frame drop to the camera drive.

Before S902, the target application may receive the image magnification operation performed by the user in the code scanning interface. The image magnification operation may be a double-click operation or a two-finger outward swipe operation.

In some embodiments, the image magnification operation includes an operation of double-clicking on an image in a code scanning box in the code scanning interface by the user. For example, after the image in the code scanning box is double-clicked on, the image is displayed in the code scanning box in a magnified manner.

In some other embodiments, the image magnification operation includes an operation of performing the two-finger outward swipe operation in the code scanning interface by the user. In this embodiment, the user uses a thumb and an index finger to simultaneously make contact with a touchscreen, to form two touch points. One of the touch points moves in a first direction, and the other of the touch points moves in a second direction. The first direction is opposite to the second direction. The target application determines that the user performs the two-finger outward swipe operation based on touch traces of the touch points, such that the target application transmits a request to end frame drop to the camera drive.

In the step, the user performs the image magnification operation to reduce a photographing distance and magnify an object, such that the object in the identification frame and the preview frame is magnified, and the image quality is improved. Therefore, the target application transmits, in response to the image magnification operation, the request to end frame drop to the camera drive, to end frame drop of the identification frame in a case that image quality is high, such that a problem of long code scanning time caused by dropping of valid identification frames is resolved.

In some embodiments, the camera drive may determine whether the identification frame includes the identification code before receiving the image magnification operation performed by the user in the code scanning interface. In a case that the identification frame includes the identification code, the camera drive determines that the image magnification operation performed by the user is used to magnify a size of the identification code.

In some embodiments, S902 may be replaced with S902a.

S902a. The target application transmits, in response to an operation of dragging an image that is performed in the code scanning interface, a request to end frame drop to the camera drive.

Before S902a, a preview frame image displayed in the code scanning interface includes no identification code, and after S902a is performed, the preview frame image displayed in the code scanning interface includes the identification code.

Specifically, in a code scanning process, when the code scanning interface includes no identification code, the user may adjust a photographing angle of the camera, to implement the identification code in the code scanning interface. In addition, the user may adjust a position of the identification code in the code scanning interface by dragging the image.

Based on the above description, when the target application detects the operation of dragging the image, it is highly possible that the identification code is included in the code scanning interface after the operation, so consecutive identification frames collected by the camera after the operation are identified. In this way, the situation that code scanning time is excessively long due to missed detection of the identification frame is avoided.

In some other embodiments, S902 may be replaced with S902b.

S902b. The target application transmits, in response to an image reduction operation performed in the code scanning interface, a request to end frame drop to the camera drive.

Before S902b, a preview frame image displayed in the code scanning interface includes no entire identification code, and after S902b is performed, the identification code is completely displayed in the code scanning interface because the image in the code scanning interface is reduced. In this way, when the target application detects an image reduction operation, the identification code may be completely displayed in the code scanning interface after the operation, so consecutive identification frames collected by the camera after the operation are identified. In this way, the situation that code scanning time is excessively long due to missed detection of the identification frame is avoided.

S903. The camera drive ends, in response to receiving the request to end frame drop, an operation of setting the frame drop flag for the identification frame according to the frame drop strategy.

Before S903, the camera drive may receive the request to end frame drop from the target application.

In this embodiment, after the camera drive receives the request to end frame drop, the operation of setting the frame drop flag for the identification frame may be ended, such that the identification frame uploaded from the camera drive to the camera service is an identification frame having no frame drop flag set. The identification frame is received by the camera service and then uploaded to the target application for identification. Refer to the above description of S607 for the operation performed by the camera service. Based on the above description, after performing S903, the mobile phone performs S607.

In summary, through the method of this embodiment, the camera drive may set the frame drop flag for the identification frame collected in a case of low image quality, to reduce a number of identification frames uploaded from the camera service to the target application, and may end the frame drop operation on the identification frame in a case of high image quality, to resolve a problem of long code scanning time caused by dropping of valid identification frames.

Figure 10A:
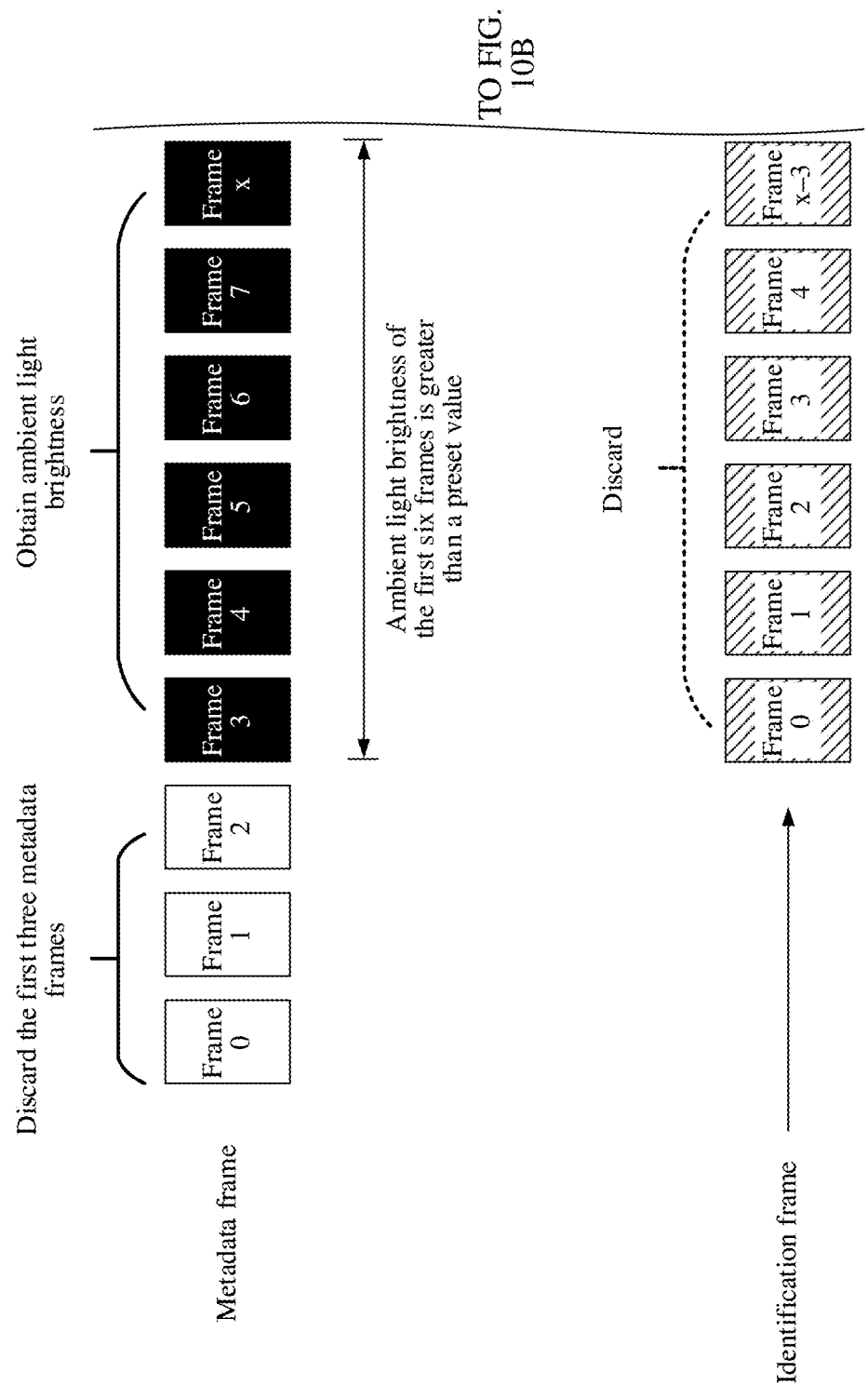
FIG. 10A and FIG. 10B show a schematic effect diagram corresponding to yet another code scanning method according to an embodiment of this application.
Figure 10B:
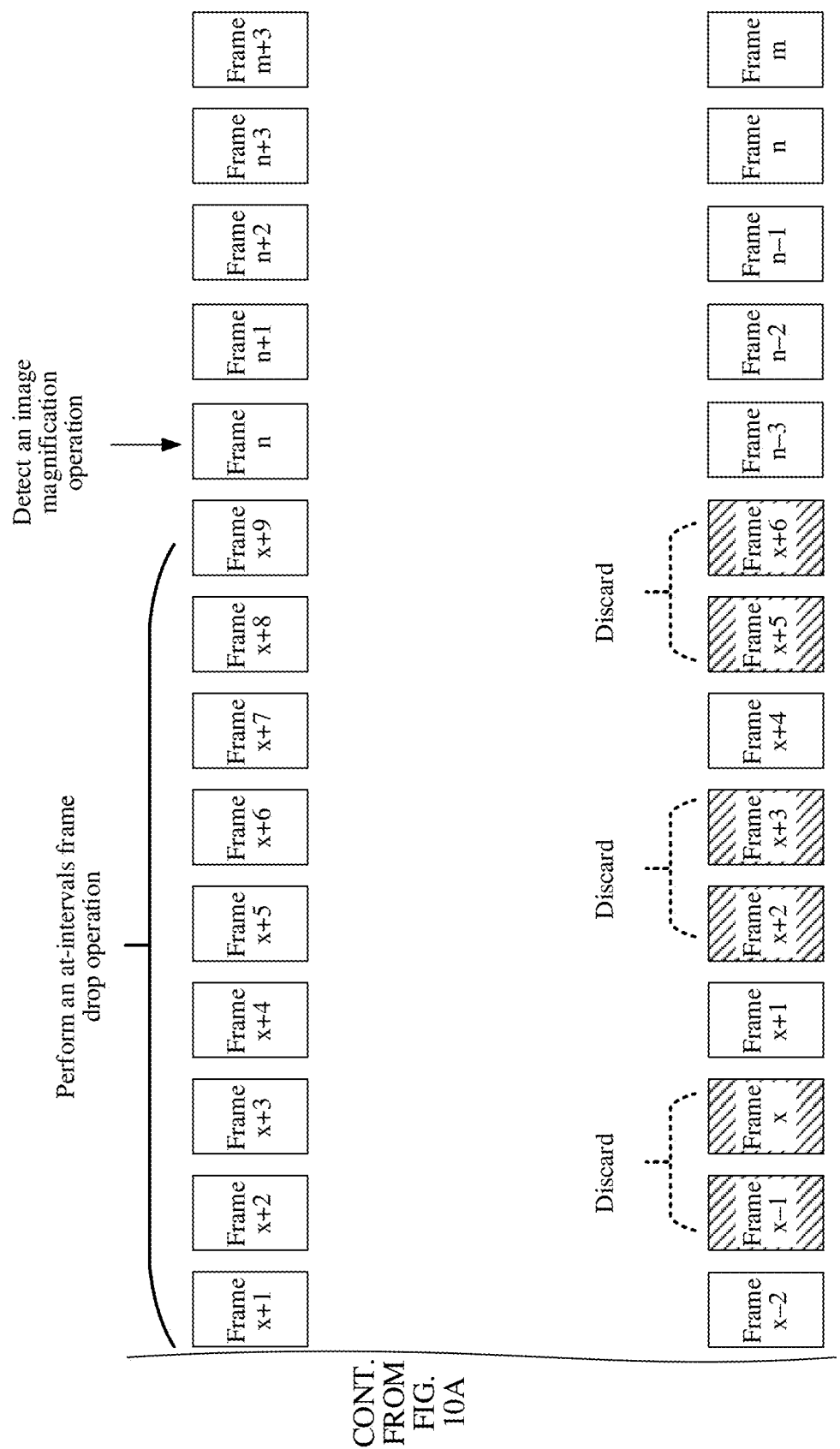

For example, as shown in FIG. 10A and FIG. 10B, through the method of this embodiment, when the camera drive obtains the identification frame, the camera drive sets frame drop flags for two consecutive identification frames with an interval of one identification frame. In response to receiving an image magnification operation of a user, the camera drive no longer drops the identification frame. In this way, in the case of the low image quality, a number of identification frames identified by the target application is much smaller than that of identification frames collected by the camera. Therefore, the identification speed is high, time consumed by a code scanning process that may be perceived by the user is short, and the user has excellent code scanning experience.

Figure 11A:
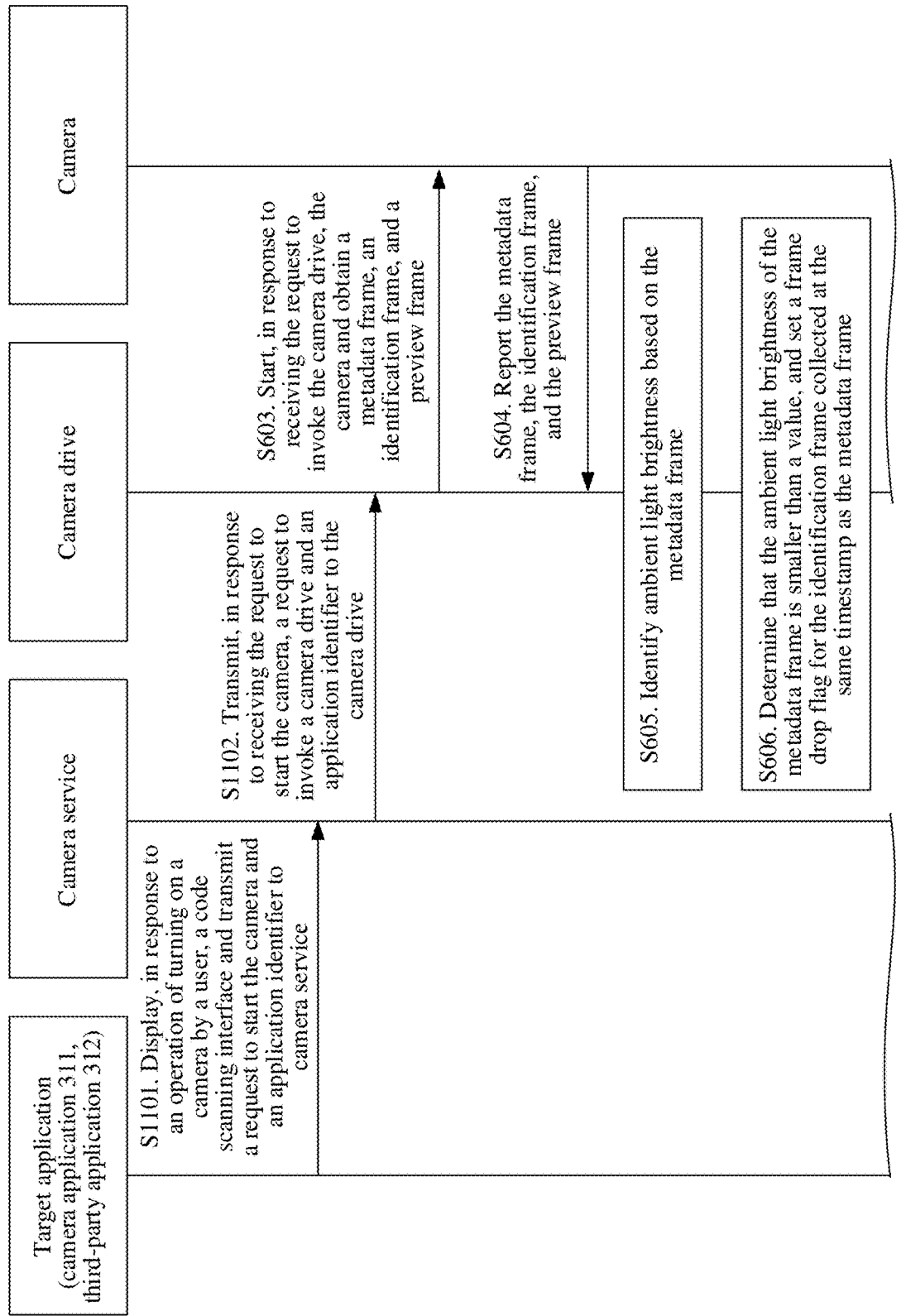
FIG. 11A and FIG. 11B show an interaction diagram of still another code scanning method according to an embodiment of this application.
Figure 11B:
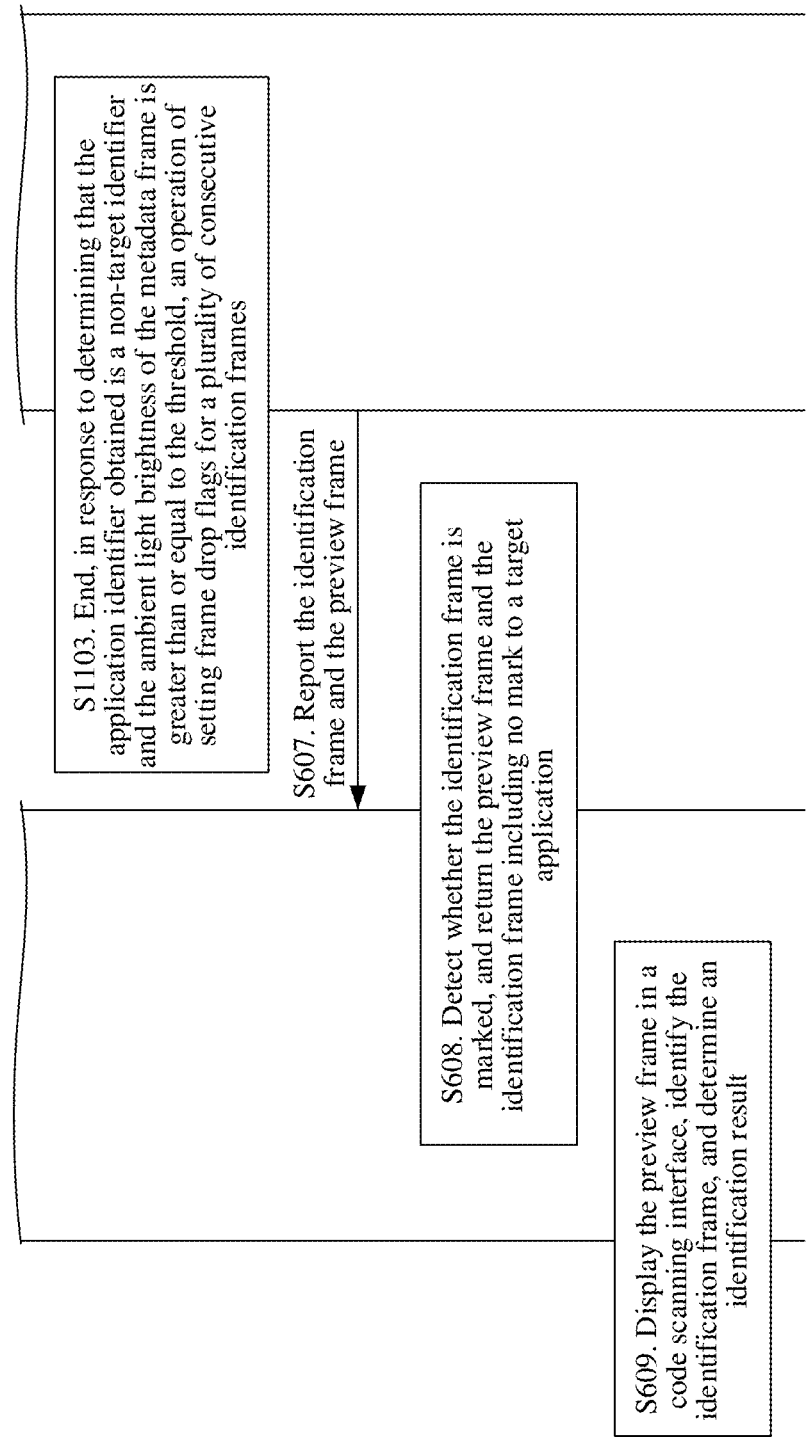

The above embodiment illustrates the frame drop operation in the code scanning process mainly in terms of an illumination environment and image quality. In practical implementation, different applications use different code scanning identification principles. For the second type of application described above, only a last identification frame after identification of each thread ends is identified, which reduces a number of identification frames required to be identified by the application. Therefore, for the type of application, an embodiment of this application further provides a code scanning method, with reference to FIG. 11A and FIG. 11B. A frame drop strategy may be determined based on an application type through S1101 to S1102, S603 to S606, S1103, and S607 to S608.

S1101. A target application displays, in response to an operation of turning on a camera by a user, a code scanning interface and transmits a request to start the camera and an application identifier to camera service.

Different from S601, the step further includes a step that the target application uploads the application identifier to the camera service to distinguish a type of an application. For example, the application identifier is used to distinguish between the first type of application and the second type of application described above.

S1102. The camera service transmits, in response to receiving the request to start the camera, a request to invoke a camera drive and an application identifier to the camera drive.

Refer to the above description of S602 for introduction of the step.

In addition, the camera service further transmits the application identifier transmitted by the target application to the camera drive, such that the camera drive determines whether to set frame drop flags for a plurality of consecutive identification frames based on the application identifier.

After performing S1102, a mobile phone may perform S602 to S606 described above, such that a frame drop flag is set for an identification frame having ambient light brightness smaller than a threshold, and then the mobile phone performs S1103.

S1103. The camera drive ends, in response to determining that the application identifier obtained is a non-target identifier and ambient light brightness of a metadata frame is greater than or equal to a threshold, an operation of setting frame drop flags for a plurality of consecutive identification frames.

The non-target identifier is used to indicate the second type of application described above. Accordingly, the target representation is used to indicate the first type of application described above.

The non-target identifier is also referred to as a preset identifier. The non-target identifier may be preset for distinguishing a target application requiring no at-intervals frame drop. In a case that the application identifier is the non-target identifier, the target application identifies only a last identification frame after identification of each thread ends, which reduces a number of identification frames required to be identified by the application. Therefore, for the second type of application, the camera drive ends the operation of setting the frame drop flags for the plurality of consecutive identification frames, to avoid a problem of a low code scanning speed caused by dropping of too many identification frames. In this way, the target application may improve an identification speed of identification codes in a dark environment without reducing the code scanning speed. Then, the camera drive reports the identification frame and the preview frame to the camera drive, such that the camera drive may conduct frame drop based on the frame drop flag of the identification frame. Based on the above description, after S1103, the mobile phone performs S607 to S609 described above, to complete the code scanning process.

Figure 12A:
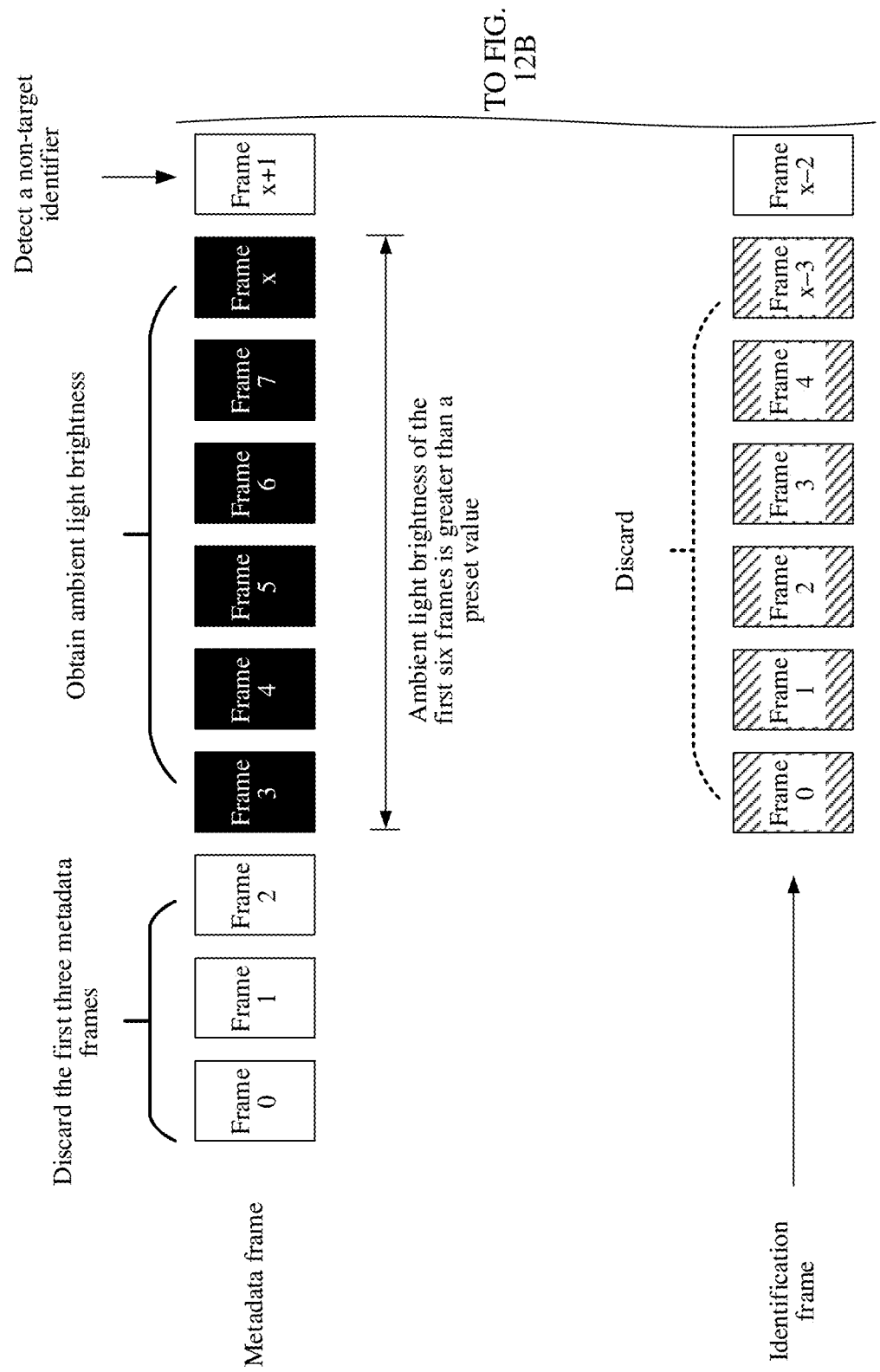

For example, as shown in FIG. 12A and FIG. 12B, through the method of this embodiment, in a case that code scanning is conducted in a dark environment, a plurality of identification frames collected by the camera in a scene of small screen brightness (that is, great Luxindex) are all dropped. In a case that the screen brightness becomes greater (that is, Luxindex is small), the camera drive determines whether the target application is a non-target application. In a case that the target application is the non-target application, the camera drive directly reports all following identification frames to the camera service, and the camera service reports the identification frames to the target application for identification. In this way, in a case that the user conducts code scanning with the second type of application, the camera drive does not drop too many identification frames, such that an identification speed of the identification code in a dark environment by the target application can be improved without reducing the code scanning speed. Therefore, the identification speed is high, time consumed by a code scanning process that may be perceived by the user is short, and the user has excellent code scanning experience.

In some embodiments, the application identifier may also distinguish between a third type of application and a fourth type of application. In the third type of application, a preview stream is used as a live preview screen and a video stream identifying an identification code. That is, the third type of application is used to transmit only one channel of stream. The preview stream is used to be displayed in the code scanning interface and to obtain information of the identification code. The fourth type of application is used to transmit two channels of streams. The preview stream is used as the video stream of the live preview screen, and the identification stream is used as an identification stream identifying the identification code.

The target application transmits the application identifier to code scanning service, such that the camera service of the underlying layer determines whether the target application is used to transmit only one channel of stream. In response to determining that only one channel of stream is used to be transmitted, the camera drive sets a frame drop flag for the preview stream. The camera service copies one channel of preview stream, uploads the channel of preview stream to the target application, and drops a preview frame having a set frame drop flag in another channel of preview stream and then uploads the channel of preview stream to the target application. In this way, this embodiment can resolve a problem that the code scanning interface cannot normally display the preview frame after the preview stream is dropped because the target application is used to transmit only one channel of stream, and further can reduce a number of preview frames to be identified by the target application without influencing normal preview of an image collected by the camera in the code scanning interface.

Figure 13:
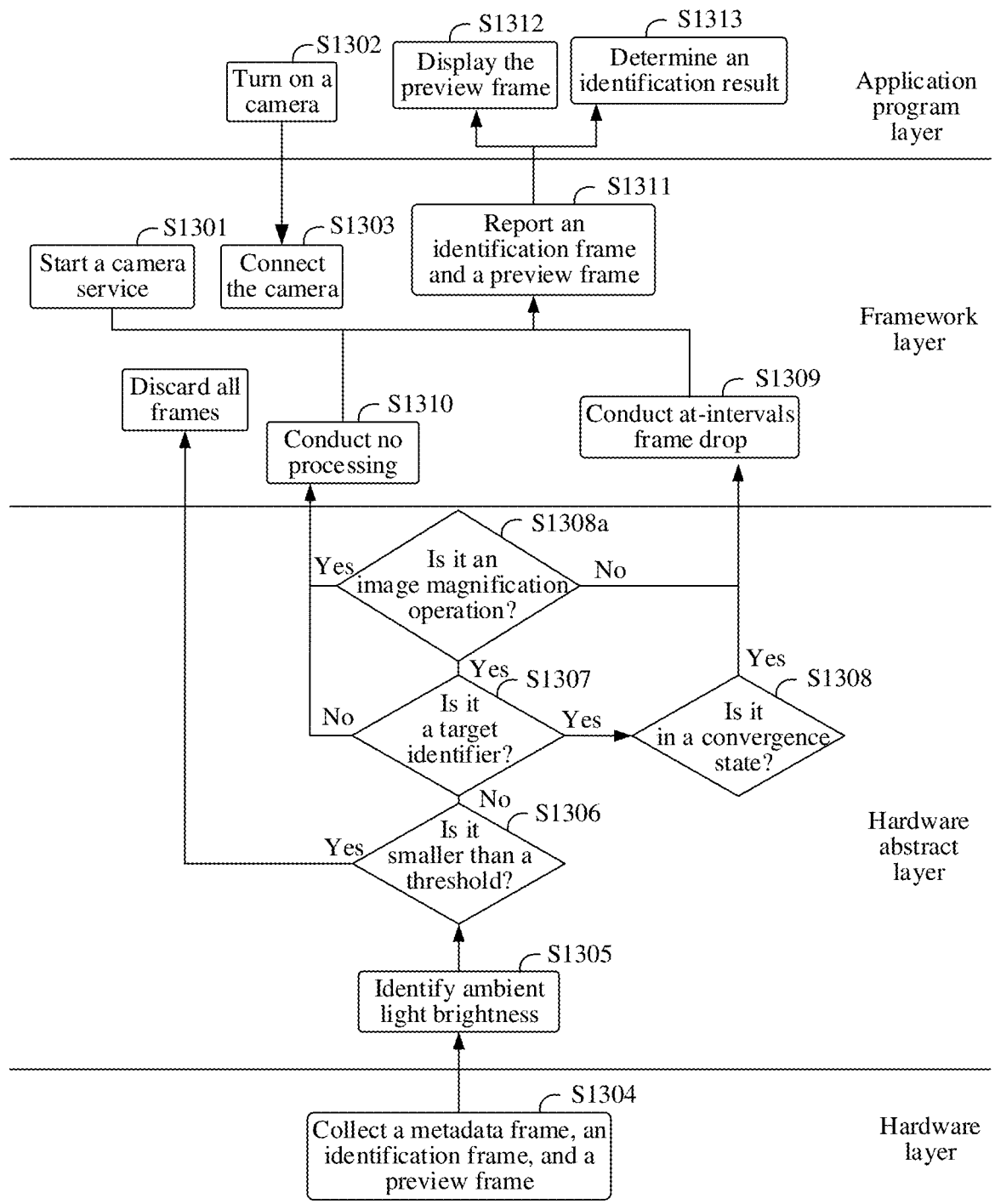
FIG. 13 shows a flow diagram corresponding to a code scanning method according to an embodiment of this application.

Therefore, to facilitate understanding of all the above embodiments, the solution of this application and effects thereof will be illustrated below with an entire procedure as an example. FIG. 13 shows a flow diagram of a code scanning method based on a specific example of this application.

With reference to FIG. 13, the code scanning method according to an embodiment of this application may include the following steps:

S1301. Start camera service as follows: The camera service may be started when a mobile phone is turned on. Alternatively, the camera service may be automatically restarted after the camera service is started.

S1302. Turn on a camera as follows: The camera may be triggered to be turned on to enter a code scanning function by turning on a camera application, entering a third-party application to use a function of the camera, or switching to a photographing mode. It should be understood that an operation of turning on the camera indicates an operation of turning on the camera and entering a code scanning interface.

S1303. Connect the camera, which may also be understood as asking to start the camera as follows: After receiving an operation of turning on the camera by the user, a target program may transmit a request to start the camera and an application identifier to the camera service. The application identifier is used to distinguish a type of a target application.

S1304. Collect a metadata frame, an identification frame and a preview frame. After receiving a request to invoke a camera drive, the camera drive may control the camera to be turned on. After the camera is turned on, raw data may be continuously collected, the raw data may be processed to obtain YUV data, and the YUV data may be split into two video streams. One channel of video stream provides identification frames, the other channel of video stream provides preview frames, and at the same time, metadata frames of the YUV data are reported.

S1305. Identify ambient light brightness. The camera drive may obtain an illumination intensity from the metadata frame, such that an illumination environment of the identification frame and the preview frame may be determined.

S1306. Determine whether ambient light brightness is smaller than a threshold. In a case that the ambient light brightness of the metadata frame is smaller than the threshold, the illumination environment of the identification frame and the preview frame is a dark scene, such that the camera drive sets a frame drop flag for the identification frame collected at the same time stamp as the metadata frame, to indicate camera service of an upper layer to drop the identification frame. In a case that the ambient light brightness is greater than or equal to the threshold, the illumination environment is light, such that the camera drive does not set a frame drop flag for the identification frame corresponding to the metadata frame, and directly uploads the identification frame to the camera service, to indicate the camera service to upload the identification frame collected at the ambient light brightness to the target application for identification processing.

S1307. Determine whether the application identifier is a target identifier. In a case that the application identifier is the target identifier, the target application is a first type of application as described above, such that an identification frame after a light illumination environment needs to be dropped. In a case that the application identifier is a non-target identifier, the target application is a second type of application as described above, such that an identification frame after a light illumination environment is continuously identified.

S1308. Determine whether AE or AF is in a convergence state. In a case that AE or AF is in the convergence state, exposure or a focal length is in an adjustment process. In a case that AE or AF is not in the convergence state, AEdone and AFdone are indicated.

S1308a. Determine whether the operation is an image magnification operation. In response to receiving an image magnification operation of a user, the camera drive no longer drops the identification frame.

S1309. Conduct at-intervals frame drop. The identification frames collected by the camera in an AE convergence state and an AF convergence state are subject to at-intervals frame drop.

S1310. Conduct no processing. At-intervals frame drop is not conducted, and each identification frame is uploaded to the target application.

S1311. Report an identification frame and a preview frame. The preview frame is used to be displayed in the code scanning interface. The identification frame is used to obtain information of the identification code.

S1312. Display the preview frame. Dropping the identification frame does not influence normal display of the preview frame in the code scanning interface, and therefore does not influence normal preview of an image collected by the camera in the code scanning interface.

S1313. Determine an identification result. The identification frame reported by a framework layer is identified at an application program layer, and an interface corresponding to the identification result is jumped to.

It may be seen that in the complete example shown in FIG. 13, the identification frame is dropped at an abstract layer, which can reduce a number of invalid identification frames identified by the application program layer, such that a number of threads created for identification frames can be reduced, a space of a memory occupied by an identification process can be decreased, and identification time can be shortened. In this way, identification efficiency is improved.

Some other embodiments of this application provide an electronic device. The electronic device may include: the display screen (for example, a touchscreen), a memory, and one or more processors. The display screen and the memory are coupled to the processor. The memory is configured to store a computer program code. The computer program code includes computer instructions. When the processor executes the computer instructions, the electronic device may perform various functions or steps performed by a mobile phone in the above method embodiments. Refer to a structure of a mobile phone 200 shown in FIG. 2 for a structure of the electronic device.

An embodiment of this application further provides a computer-readable storage medium. The computer-readable storage medium includes computer instructions. When the computer instructions are run on the electronic device, the electronic device is enabled to perform various functions or steps performed by a mobile phone in the above method embodiments.

An embodiment of this application further provides a computer program product. When the computer program product runs on a computer, the computer is enabled to perform various functions or steps performed by a mobile phone in the above method embodiments.

Through the description of the above implementations, those skilled in the art may clearly understand that, for convenient and brief description, only division of the above functional modules is illustrated. In actual application, the above functions may be allocated to and completed by different functional modules based on needs. That is, an inner structure of an apparatus is divided into different functional modules, to complete all or some of the functions described above.

In several embodiments according to this application, it should be understood that the disclosed apparatus and method may be implemented in other manners. For example, the above apparatus embodiment is merely illustrative. For example, module or unit division is merely logical function division and may be another division during actual implementation. For example, a plurality of units or components may be combined or integrated into another apparatus, or some features may be omitted or not performed. In addition, the displayed or discussed mutual coupling or direct coupling or communication connection may be implemented with some interfaces. Indirect coupling or communication connection between the apparatuses or units may be implemented in an electronic way, a mechanical way, or other ways.

The units described as separate parts may or may not be physically separated. A part displayed as a unit may be one physical unit or a plurality of physical units, which may be located at one position or may be distributed at different positions. Some or all of the units may be selected based on actual needs, to achieve the objective of the solution of the embodiments.

In addition, all the functional units in all the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, etc.) or a processor to perform all or some of the steps of the method according to all the embodiments of this application. The above storage medium includes: any medium that may store a program code, such as a USB flash drive, a removable hard disk, a read only memory (ROM), a random access memory (RAM), a magnetic disk, or a compact disc.

What are described above are merely specific implementations of this application, but are not intended to limit the protection scope of this application. Any changes or substitutions within the technical scope disclosed in this application should fall within the protection scope of this application. Therefore, the protection scope of this application should be subject to the protection scope of the claims.

The invention claimed is:

1. A code scanning method, applied to an electronic device, wherein the electronic device comprises a camera, and the method comprises:
    displaying a code scanning interface;
    obtaining an identification frame image and a preview frame image, wherein the identification frame image and the preview frame image are obtained by processing a code scanning image collected by the camera;
    displaying the preview frame image in the code scanning interface;
    determining a preset condition for setting a frame drop flag;
    setting the frame drop flag for at least one identification frame image in each preset frame drop periodicity; and
    conducting, in a case that ambient light brightness of the identification frame image is greater than or equal to a threshold, code scanning identification on the identification frame image comprising no frame drop flag, and determining a code scanning identification result.

2. The method according to claim 1, wherein the conducting, in a case that ambient light brightness of the identification frame image is greater than or equal to a threshold, code scanning identification on the identification frame image comprises:
    conducting, in a case that the ambient light brightness of the identification frame image is greater than or equal to the threshold and an exposure convergence operation and a focus convergence operation of the camera are completed, code scanning identification on the identification frame image; and
    the method further comprises:
    deleting, in a case that the ambient light brightness of the identification frame image is greater than or equal to the threshold and the exposure convergence operation or the focus convergence operation of the camera is detected, the identification frame image obtained by the camera based on the code scanning image in a process of performing the exposure convergence operation or the focus convergence operation, wherein the identification frame image deleted is not for code scanning identification.

3. The method according to claim 1, wherein the conducting, in a case that ambient light brightness of the identification frame image is greater than or equal to a threshold, code scanning identification on the identification frame image comprises:
    conducting, in a case that the ambient light brightness of the identification frame image is greater than or equal to the threshold, the identification frame image comprises an identification code, and a size of the identification code increases, code scanning identification on the identification frame image corresponding to the identification code having a size increased.

4. The method according to claim 1, wherein the conducting, in a case that ambient light brightness of the identification frame image is greater than or equal to a threshold, code scanning identification on the identification frame image comprises:
    conducting, in a case that the ambient light brightness of the identification frame image is greater than or equal to the threshold and an image magnification operation performed in the code scanning interface is detected, code scanning identification on the identification frame image obtained based on the code scanning image after the image magnification operation is performed.

5. The method according to claim 4, wherein before the conducting code scanning identification on the identification frame image obtained based on the code scanning image after the image magnification operation is performed, the method further comprises:
    determining that the identification frame image comprises the identification code.

6. The method according to claim 1, wherein before the displaying a code scanning interface, the method further comprises:
    starting a target application; and
    the conducting, in a case that ambient light brightness of the identification frame image is greater than or equal to a threshold, code scanning identification on the identification frame image comprises:
    conducting, in a case that the ambient light brightness of the identification frame image is greater than or equal to the threshold and an application identifier of the target application is a preset identifier, code scanning identification on the identification frame image.

7. The method according to claim 1, wherein the conducting, in a case that ambient light brightness of the identification frame image is greater than or equal to a threshold, code scanning identification on the identification frame image comprises:
    conducting, in a case that the ambient light brightness of the identification frame image is greater than or equal to the threshold, the identification frame image comprises no identification code, and a dragging operation on the preview frame image in the code scanning interface is detected, code scanning identification on the identification frame image obtained by processing the same code scanning image as the preview frame image.

8. The method according to claim 1, the method further comprises:
    obtaining a metadata frame, wherein the metadata frame comprises a collection parameter of the code scanning image used to be processed to obtain the identification frame image; and obtaining an illumination intensity parameter from the collection parameter, and determining the ambient light brightness of the identification frame image based on the illumination intensity parameter.

9. The method according to claim 1, wherein the preset condition is one or more of:
   in a case that the ambient light brightness of the identification frame image is smaller than the threshold, or
   in a case that the exposure convergence operation or the focus convergence operation of the camera is detected in the case that the ambient light brightness of the identification frame image is greater than or equal to the threshold, or
   in a case that the size of the identification code in the identification frame image is smaller than or equal to a preset size in the case that the ambient light brightness of the identification frame image is greater than or equal to the threshold, or
   in a case that the identification frame image comprises no identification code in the case that the ambient light brightness of the identification frame image is greater than or equal to the threshold.

10. An electronic device, comprising: a memory and one or more processors, wherein the memory is coupled to the processor, and the memory is configured to store a computer program code, wherein the computer program code comprises computer instructions; and
   when the processor executes the computer instructions, the electronic device performs the method according to claim 1.

11. A computer-readable storage medium, comprising computer instructions, wherein when the computer instructions are run on an electronic device, the electronic device is enabled to perform the method according to claim 1.

12. The method according to claim 1, wherein the ambient light brightness of the identification frame image comprising the no frame drop flag is greater than or equal to the threshold.

* * * * *